United States Patent
Ikegami et al.

(10) Patent No.: US 7,911,681 B2
(45) Date of Patent: Mar. 22, 2011

(54) DISPLAY DEVICE, ITS MANUFACTURING METHOD, AND DISPLAY MEDIUM

(75) Inventors: Kanami Ikegami, Shinjuku-ku (JP); Masanori Akada, Shinjuku-ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 580 days.

(21) Appl. No.: 11/573,593

(22) PCT Filed: Jul. 27, 2006

(86) PCT No.: PCT/JP2006/015366
§ 371 (c)(1),
(2), (4) Date: Feb. 12, 2007

(87) PCT Pub. No.: WO2007/013682
PCT Pub. Date: Feb. 1, 2007

(65) Prior Publication Data
US 2009/0034054 A1 Feb. 5, 2009

(30) Foreign Application Priority Data

Jul. 29, 2005 (JP) ................................. 2005-220957
Aug. 5, 2005 (JP) ................................. 2005-227898
Jan. 18, 2006 (JP) ................................. 2006-010205
Jun. 29, 2006 (JP) ................................. 2006-179274

(51) Int. Cl.
*G02B 26/00* (2006.01)

(52) U.S. Cl. ........................................ 359/296; 359/295

(58) Field of Classification Search .......... 359/295–298; 430/31–32; 345/107
See application file for complete search history.

(56) References Cited

U.S. PATENT DOCUMENTS 3,767,392 A * 10/1973 Ota ................................. 430/35
5,808,593 A * 9/1998 Sheridon .......................... 345/84
2003/0214567 A1 * 11/2003 Kanazawa et al. ............ 347/112

FOREIGN PATENT DOCUMENTS

JP 2004144998 5/2004
JP 2004 104670 12/2004

OTHER PUBLICATIONS

U.S. Appl. No. 12/282,514, filed Sep. 11, 2008, Ikegami.

* cited by examiner

*Primary Examiner* — Jessica T Stultz
*Assistant Examiner* — Mahidere S Sahle
(74) *Attorney, Agent, or Firm* — Oblon, Spivak, McClelland, Maier & Neustadt, L.L.P.

(57) ABSTRACT

A display system is built up of at least one display cell comprising an assembly which has at least a first electrode and a second electrode and in which there are mutually non-miscible first and second liquids filled, wherein either one of the first and second electrodes is electrically insulated from the first and second liquids, the first liquid has electrical conductivity or polarity, and voltage is applied to one or both of the first and second electrodes, whereby the first liquid and the second liquid can vary in position to produce a display. Even after an applied voltage is shut off at a position to which the first and second liquids have migrated, the positions of the first and second liquids that have migrated are retained to keep memory capability going on.

14 Claims, 17 Drawing Sheets

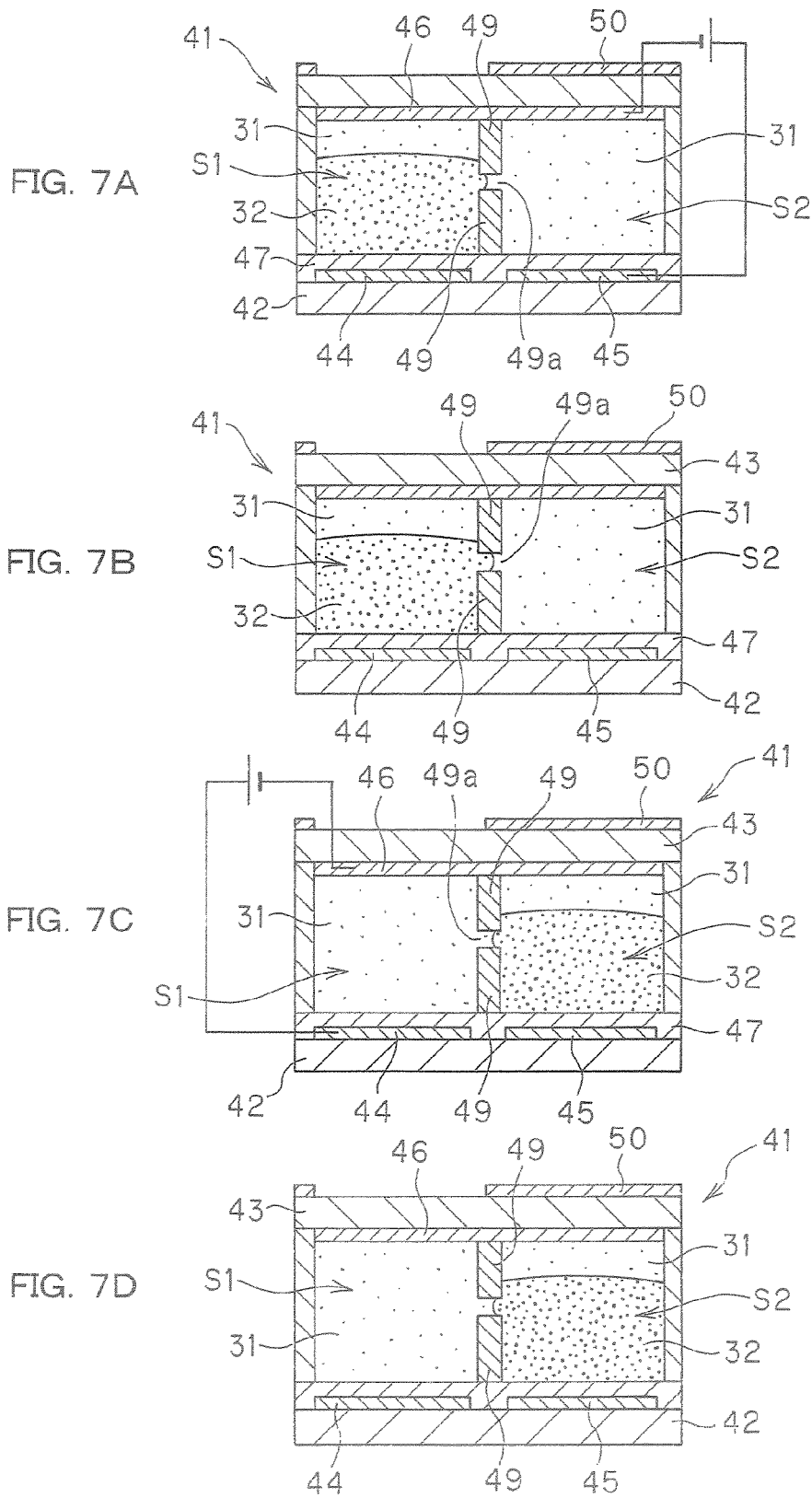

DISPLAY DEVICE, ITS MANUFACTURING METHOD, AND DISPLAY MEDIUM

ART FIELD

The present invention relates generally to a display system based on electrophoresis and its manufacture method as well as a display medium incorporating that display system, and more particularly a display system capable of sustaining a display state even after an applied voltage is shut off and its manufacture method as well as a display medium.

BACKGROUND ART

In recent years, there has been a display system developed, which harnesses a phenomenon in which, by applying voltage to an electrophoresis display device wherein a microcapsule having electrophoresis particles and a dispersion medium is interleaved as that electrophoresis display device between two electrodes, the electrophoresis particles migrate through the microcapsule toward electrodes having different polarities by way of electrophoresis (see JP-A's 2002-357853 and 2002-333643). That display system is capable of producing color displays, because microcapsules containing yellow, magenta and cyan dispersion media, respectively, are used with each one microcapsule interleaved between a pair of associated electrodes for each color.

There has also been a display system developed, in which a plurality of cells, each having an electrode having a hydrophobic surface in opposition to an electrode having a hydrophilic surface, are filled with water and colored oil so that at no applied voltage, the colored oil spreads over the hydrophobic electrode surface, and at a voltage applied between the electrodes, the colored oil migrates toward and builds up on a given site of the hydrophobic electrode surface (see International Publication Nos. WO 2004/104670, WO 2004/068208 and WO 2004/104671). This display system, too, is capable of producing color displays by use of oils colored in yellow, magenta and cyan.

With the prior art display system set forth in JP-A's 2002-357853 and 2002-333643, however, there is a problem that it is difficult to arrange microcapsules without giving rise to defects, resulting in an image quality deterioration.

With the prior art display system set forth in International Publication Nos. WO 2004/104670, WO 2004/068208 and WO 2004/104671, a problem is that when the application of voltage is shut off, the oil migrating to and building up on the given site of the hydrophobic electrode comes to spread over the hydrophobic electrode surface; there is lack of any memory capability. This requires perpetual power supply, leading to a failure in cutting down power consumption.

DISCLOSURE OF THE INVENTION

One object of the present invention is to provide a fast-response, low-consumption display system and manufacture method thereof and a display medium.

According to one embodiment of the present invention, that object is achievable by the provision of a display system built up of at least one display cell comprising an assembly which has at least a first electrode and a second electrode and in which there are mutually non-miscible first and second liquids filled, wherein either one of said first and second electrodes is electrically insulated from said first and second liquids, said first liquid has electrical conductivity or polarity, and voltage is applied to one or both of said first and second electrodes, whereby said first liquid and said second liquid can vary in position to produce a display, wherein: even after an applied voltage is shut off at a position to which said first and second liquids have migrated, positions of said first and second liquids that have migrated are retained to keep memory capability going on.

According to another embodiment of the invention, the display system further comprises a liquid retainer means for retaining the positions of said first and second liquids that have migrated, after the applied voltage is shut off at the positions of said first and second liquids that have migrated.

The embodiment here makes surer the retaining of the first and second liquids that have migrated.

According to yet another embodiment of the invention, said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on one substrate that faces said liquid confining space in an electrically independent way, an intermediate partition located at a boundary site between said $1^{st}$-A and $1^{st}$-B electrodes, and a second electrode that is located on another substrate that faces said liquid confining space, wherein said $1^{st}$-A and $1^{st}$-B electrodes are electrically insulated from said first and second liquids; at a voltage applied to said $1^{st}$-A electrode and said second electrodes or a voltage applied to said $1^{st}$-B electrode and said second electrode, said second liquid goes over said intermediate partition in such a way as to be able to migrate between on said $1^{st}$-A electrode and on said $1^{st}$-B electrode; and said intermediate partition works as said liquid retainer means.

In the embodiment here, the voltage applied to the $1^{st}$-A electrode and the second electrode or the voltage applied to the $1^{st}$-B electrode and the second electrode ensures a fast-response display, and the intermediate partition that forms the liquid retainer means makes surer the retaining of the first and second liquids that have migrated.

According to a further embodiment of the invention, the wettability of said first liquid to said wall portion is larger than that of said first liquid to said $1^{st}$-A electrode and said $1^{st}$-B electrode.

In the embodiment here, the deflection of the second liquid toward the wall of the liquid confining space is held back.

According to a further embodiment of the invention, there is a thin film provided on said second electrode that faces said liquid confining space, wherein the wettability of said second liquid to said thin film is smaller than that of said second liquid to said $1^{st}$-A electrode and said $1^{st}$-B electrode.

This embodiment ensures prevention of adhesion of the second liquid to the second electrode and improvements in the wet spreading of the first liquid.

According to a further embodiment of the invention, a lipophilic insulating film is located over the surfaces of said $1^{st}$-A electrode and said $1^{st}$-B electrode coming into contact with said first and second liquids.

This embodiment ensures that the wettability of the second liquid to the surface of the $1^{st}$-A or $1^{st}$-B electrode is much more improved with improvements in the thickness uniformity of the second liquid.

According to a further embodiment of the invention, the wettability of said first liquid to said wall portion is larger than that of said first liquid to said insulating layer.

This embodiment prevents the deflection of the second liquid toward the wall of the liquid confining space.

According to a further embodiment of the invention, there is a thin film provided on said second electrode that faces said liquid confining space, wherein the wettability of said second liquid to said thin film is smaller than that of said second liquid to said insulating layer.

This embodiment ensures prevention of adhesion of the second liquid to the second electrode, and improvements in the wet spreading of the first liquid.

According to a further embodiment of the invention, said intermediate partition has a height enough to ensure that when the applied voltage is shut off, said second liquid resting on said $1^{st}$-A electrode or said $1^{st}$-B electrode does not go over it.

In this embodiment, the intermediate partition makes surer the retaining of the second liquid that has migrated.

According to a further embodiment of the invention, said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on one substrate that faces said liquid confining space in an electrically independent way, an intermediate partition located at a boundary site between said $1^{st}$-A electrode and said $1^{st}$-B electrodes to divide said liquid confining space in a direction along said substrate surface, and a second electrode that is located on another substrate that faces said liquid confining space, wherein said $1^{st}$-A electrode and said $1^{st}$-B electrode are electrically insulated from said first and second liquids; said intermediate partition has an opening that defines a liquid flow path; at a voltage applied to said $1^{st}$-A electrode and said second electrode or a voltage applied to said $1^{st}$-B electrode and said second electrode, said second liquid passes through the opening in said intermediate partition in such a way as to be able to migrate between on said $1^{st}$-A electrode and on said $1^{st}$-B electrode; and said intermediate partition works as said liquid retainer means.

In the embodiment here, the voltage applied to the $1^{st}$-A electrode and the second electrode or the voltage applied to the $1^{st}$-B electrode and the second electrode ensures a fast-response display, and the intermediate partition having an opening makes surer the retaining of the first and second liquids that have migrated.

According to a further embodiment of the invention, the wettability of said first liquid to said wall portion is larger than that of said first liquid to said $1^{st}$-A electrode and said $1^{st}$-B electrode.

In the embodiment here, the deflection of the second liquid toward the wall of the liquid confining space is held back.

According to a further embodiment of the invention, there is a thin film provided on the side of said second electrode that faces said liquid confining space, wherein the wettability of said second liquid to said thin film is smaller than that of said second liquid to said $1^{st}$-A electrode and said $1^{st}$-B electrode.

This embodiment ensures prevention of adhesion of the second liquid to the second electrode, and improvements in the wet spreading of the first liquid.

According to a further embodiment of the invention, a lipophilic insulating film is located over the surfaces of said $1^{st}$-A electrode and said $1^{st}$-B electrode coming into contact with said first and second liquids.

This embodiment of the invention ensures that the wettability of the second liquid to the surface of the $1^{st}$-A or $1^{st}$-B electrode is much more improved with improvements in the thickness uniformity of the second liquid.

According to a further embodiment of the invention, the wettability of said first liquid to said wall portion is larger than that of said first liquid to said insulating layer.

This embodiment prevents the deflection of the second liquid toward the wall portion of the liquid confining space.

According to a further embodiment of the invention, there is a thin film provided on the side of said second electrode that faces said liquid confining space, wherein the wettability of said second liquid to said thin film is smaller than that of said second liquid to said insulating layer.

This embodiment ensures prevention of adhesion of the second liquid to the second electrode, and improvements in the wet spreading of the first liquid.

According to a further embodiment of the invention, said second liquid has a surface tension of 10 to 73 dyne/cm at 20° C. and said opening in said intermediate partition has a width of 1 to 1,000 µm.

In this embodiment, the intermediate partition makes surer the retaining of the second liquid that has migrated.

According to a further embodiment of the invention, a desired pattern of light block film is provided on the outside of the transparent substrate on a display viewing side.

This embodiment is capable of producing an on/off display depending on whether or not the second liquid is positioned on an electrode surface at a site with no light block film found.

According to a further embodiment of the invention, said second liquid is colored oil.

This embodiment is capable of displaying information or the like in a desired color.

According to a further embodiment of the invention, there is a reflection type display where light reflected from within the display cell is viewed, and the colored oil that is said second liquid filled in each display cell is any one of yellow magenta, and cyan.

This embodiment is capable of producing a reflection type full-color display.

According to a further embodiment of the invention, there is a transmission type display where light transmitting through the display cell is viewed, and said first liquid is colored water while the colored oil that is said second liquid is light blocking black oil.

This embodiment is capable of producing a colored display in a color transmitting through the colored water and black.

According to a further embodiment of the invention, the colored water that is said first liquid filled in each display cell is any one of red, green, and blue.

This embodiment is capable of producing a transmission type full-color display.

According to a further embodiment of the invention, said $1^{st}$-A electrode and said $1^{st}$-B electrode for each display cell are identical in configuration and position.

The embodiment here ensures that uniform display performance is achievable throughout the display system.

According to a further embodiment of the invention, said assembly comprises a set of substrates, at least one of which is transparent, a wall portion for holding said set of substrates in opposition to one another in such a way as to define a liquid confining spaces a $1^{st}$-A electrode located on one substrate that faces said liquid confining space, a $1^{st}$-B electrode located on another substrate that faces said liquid confining space, and a second electrode located substantially parallel with said $1^{st}$-A electrode and said $1^{st}$-B electrode and adapted to divide said liquid confining space, wherein said second electrode has a plurality of through-holes in at least a part, said $1^{st}$-A electrode and said $1^{st}$-B electrode are electrically insulated from said first and second liquids; at a voltage applied to said $1^{st}$-A electrode and said second electrode or a voltage applied to said $1^{st}$-B electrode and said second electrode, said second liquid passes through the through-holes in said second electrode in such a way as to be able to migrate between said liquid confining space on said $1^{st}$-A electrode and said liquid confining space on said $1^{st}$-B electrode; and said second electrode works as said liquid retainer means.

In this embodiment, the voltage applied to the $1^{st}$-A electrode and the second electrode or the voltage applied to the $1^{st}$-B electrode and the second electrode ensures a fast-response display, and the second electrode as a liquid retainer means makes surer the retaining of the first and second liquids that have migrated.

According to a further embodiment of the invention, said second electrode is an electrically conducting material having a plurality of through-holes.

In the embodiment here, the liquid retainer means provides the second electrode as such.

According to a further embodiment of the invention, said second electrode is an electrically conductive film formed on the surface of an insulating material having a plurality of through-holes.

In the embodiment here, the liquid retainer means could be formed of any desired material.

According to a further embodiment of the invention, the wettability of said first liquid to said wall portion is larger than that of said first liquid to said $1^{st}$-A electrode and said $1^{st}$-B electrode.

In embodiment here, the deflection of the second liquid toward the wall of the liquid confining space is held back.

According to a further embodiment of the invention, there is a thin film provided on said second electrode, wherein the wettability of said second liquid to said thin film is smaller than that of said second liquid to said $1^{st}$-A electrode and said $1^{st}$-B electrode.

This embodiment ensures prevention of adhesion of the second liquid to the second electrode, and improvements in the wet spreading of the first liquid.

According to a further embodiment of the invention, a lipophilic insulating film is located over the surfaces of said $1^{st}$-A electrode and said $1^{st}$-B electrode.

This embodiment of the invention ensures that the wettability of the second liquid to the surface of the $1^{st}$-A or $1^{st}$-B electrode is much more improved at both liquid confining spaces divided by the second electrode, with improvements in the thickness uniformity of the second liquid.

According to a further embodiment of the invention, the wettability of said first liquid to said wall portion is larger than that of said first liquid to said insulating layer.

This embodiment prevents the deflection of the second liquid toward the wall of the liquid confining space.

According to a further embodiment of the invention, there is a thin film provided on said second electrode, wherein the wettability of said second liquid to said thin film is smaller than that of said second liquid to said insulating layer.

This embodiment ensures prevention of adhesion of the second liquid to the second electrode, and improvements in the wet spreading of the first liquid.

According to a further embodiment of the invention, said second liquid has a surface tension of 10 to 73 dyne/cm at 20° C., and said through-holes in said second electrode have a width of 1 to 1,000 μm.

In this embodiment, the second electrode makes surer the retaining of the second liquid that has migrated.

According to a further embodiment of the invention, a desired pattern of light blocking film is provided on the outside of the transparent substrate on a display viewing side.

This embodiment is capable of producing an on/off display depending on whether or not the second liquid is positioned on an electrode surface at a site with no light block film found.

According to a further embodiment of the invention, said second liquid is colored oil.

This embodiment is capable of displaying information or the like in a desired color.

According to a further embodiment of the invention, there is a reflection type display where light reflected from within the display cell is viewed, and the colored oil that is said second liquid filled in each display cell is any one of yellow, magenta, and cyan.

This embodiment is capable of producing a reflection type full-color display.

According to a further embodiment of the invention, said assembly comprises a set of substrates, at least one of which is transparent, a wall portion for holding said set of substrates in opposition to one another in such a way as to define a liquid confining space, a $1^{st}$-A electrode and a $1^{st}$-B electrode that are located on one substrate that faces said liquid confining space in an electrically independent way, an oil repellent layer located at a boundary site between said $1^{st}$-A electrode and said $1^{st}$-B electrode, a lipophilic layer located in such a way as to cover said $1^{st}$-A electrode and said $1^{st}$-B electrode at a site with no said oil repellent layer located, and a second electrode that is located on another substrate that faces said liquid confining space, wherein said $1^{st}$-A electrode and said $1^{st}$-B electrode are electrically insulated from said first and second liquids; and at a voltage applied to said $1^{st}$-A electrode and said second electrode or a voltage applied to said $1^{st}$-B electrode and said second electrode, said second liquid goes over said oil repellent layer in such a way as to be able to migrate between on said $1^{st}$-A electrode and on said $1^{st}$-B electrode; and said oil repellent layer works as said liquid retainer means.

In the embodiment here, the voltage applied to the $1^{st}$-A electrode and the second electrode or the voltage applied to the $1^{st}$-B electrode and the second electrode ensures a fast-response display, and the oil repellent layer that is the liquid retainer means makes surer the retaining of the first and second liquids that have migrated.

According to a further embodiment of the invention, said oil repellent layer and said lipophilic layer are located over said $1^{st}$-A electrode and said $1^{st}$-B electrode by way of an insulating layer.

In the embodiment here, the range of selection of materials forming the oil repellent layer and lipophilic layer grows much wider.

According to a further embodiment of the invention, said oil repellent layer and said lipophilic layer each possess electrical insulation.

In the embodiment here, simple layer construction makes easier manufacturing.

According to a further embodiment of the invention said oil repellent layer is configured in such a way as to project toward said liquid confining space.

In this embodiment, the oil repellent layer makes surer the retaining of the second liquid that has migrated.

According to a further embodiment of the invention, the wettability of said first liquid to said wall portion is larger than that of said first liquid to said oil repellent layer and said lipophilic layer.

In the embodiment here, the deflection of the second liquid toward the wall of the liquid confining space is held back.

According to a further embodiment of the invention, there is a thin film provided on said second electrode that faces said liquid confining space, wherein the wettability of said second liquid to said thin film is smaller than that of said second liquid to said oil repellent layer and said lipophilic layer.

This embodiment ensures prevention of adhesion of the second liquid to the second electrode, and improvements in the wet spreading of the first liquid.

According to a further embodiment of the invention, a desired pattern of light block film is provided on the outside of the transparent substrate on a display viewing side.

This embodiment is capable of producing an on/off display depending on whether or not the second liquid is positioned on an electrode surface at a site with no light block film found.

According to a further embodiment of the invention, said second liquid is colored oil.

This embodiment is capable of displaying information or the like in a desired color.

According to a further embodiment of the invention, there is a reflection type display where light reflected from within the display cell is viewed, and the colored oil that is said second liquid filled in each display cell is any one of yellow, magenta, and cyan.

This embodiment is capable of producing a reflection type full-color display.

According to a further embodiment of the invention, there is a transmission type display where light transmitting through the display cell is viewed, and said first liquid is colored water while the colored oil that is said second liquid is a light blocking black oil.

This embodiment is capable of producing a colored display in a color transmitting through the colored water and black.

According to a further embodiment of the invention, the colored water that is said first liquid filled in each display cell is any one of red, green, and blue.

This embodiment is capable of producing a transmission type full-color display.

According to a further embodiment of the invention, said $1^{st}$-A electrode and said $1^{st}$-B electrode for each display cell are identical in configuration and position.

The embodiment here ensures that uniform display performance is achievable throughout the display system.

According to the present invention detailed above, images are displayed by position changes of the first and second liquids due to an applied voltage and there can be memory capability kept going on even after the applied voltage is shut off; it is possible to achieve a fast-response, low-consumption display system that dispenses with perpetual power supply.

In the inventive display system manufacture method, the oil repellent resin layer is formed, and that resin layer is subjected to pattern exposure to make an exposure site lipophilic, so that the oil repellent layer and the lipophilic layer are formed.

According to another embodiment of the invention, said oil repellent resin layer is subjected to pattern exposure by way of a photocatalyst layer.

With the photocatalyst used in the embodiment here, the exposure site is more reliably made lipophilic.

With the above manufacture method of the invention, it is possible to manufacture a display system having a high-definition display cell.

The display medium of the invention comprises at least one such display system as described above, and includes an input terminal for feeding power and signals from external equipment to each display cell in the display system, wherein at that input terminal the display medium can be connected to or disconnected from the external equipment.

The inventive display medium as described above keeps memory capability going on even after disconnected from the external equipment; information can be carried with the display medium only because of no need of perpetual power supply.

BRIEF EXPLANATION OF THE DRAWINGS

FIGS. 7A, 7B, 7C and 7D are illustrative of the operation of the display system according to the invention.

BEST MODE FOR CARRYING OUT THE INVENTION

Embodiments of the invention are now explained with reference to the accompanying drawings.

Figure 1:
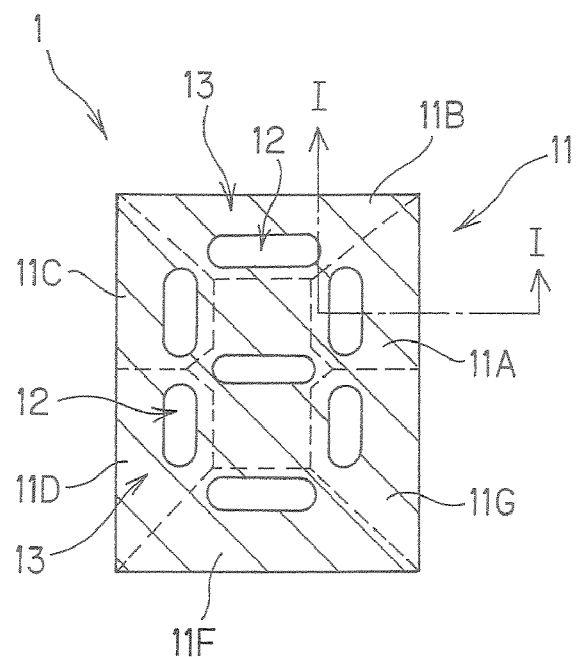
FIG. 1 is illustrative in plan of one embodiment of the display system according to the invention.

FIG. 1 is illustrative in plan of one embodiment of the display system according to the invention. As shown in FIG. 1, a display system 1 of the invention comprises a plurality of display cells 11 (seven display cells 11A, 11B, 11C, 11D, 11E, 11F, 11G are depicted in FIG. 1). Each display cell 11 is built up of an assembly which has at least a first electrode and a second electrode, and in which mutually non-miscible first and second liquids are filled. Either one of the first and second electrodes is electrically insulated from the first and second liquids with the first liquid having electrical conductivity or polarity. By the application of voltage to one or both of the first and second electrodes, the first and second liquids are displaced to produce a display. Each display cell 11 comprises a pixel segment 12 and a space segment 13, wherein the pixel segment 12 is capable of producing an on/off display by displacements of the first and second liquids upon voltage applied on it, so that the display system 1 can provide a display of numeric information of "0" to "9". In the display system 1 of the invention, the pixel segment 12 of each display cell 11 has such memory capability as can keep on/off displays going on even after the applied voltage is shut off.

In FIG. 1, it is noted that the boundary line for each display cell 11 is indicated by chain lines and the space segment 13 is indicated by oblique lines.

First Embodiment

Figure 2:
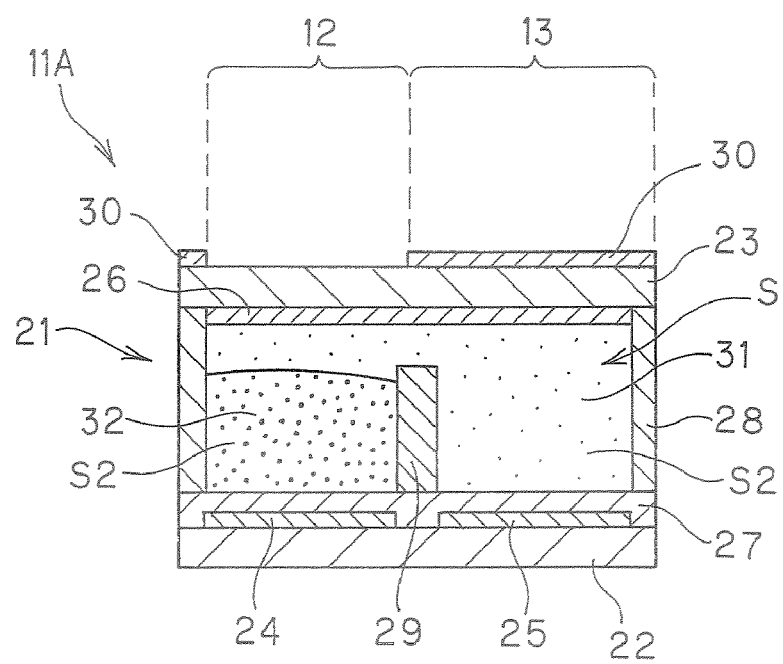
FIG. 2 is an enlarged, longitudinally sectioned view as taken on line I-I of the display system shown in FIG. 1.

FIG. 2 is an enlarged, longitudinally sectioned view of the first embodiment of the display system according to the invention indicative of the structure of one display cell in a longitudinal section as taken on line I-I in FIG. 1. As shown in FIG. 2, a display cell 11A is built up of an assembly 21 in which a first liquid 31 having electrical conductivity or polarity and a second hydrophobic liquid 32 are filled. Note here that display cells other than 11A, too, have a similar structure as shown in FIG. 2.

The assembly 21 comprises a set of substrates 22 and 23 and a wall portion 28 for supporting them in opposition to one another to define a liquid confining space S. On a side that faces the liquid confining space S, one substrate 22 comprises a $1^{st}$-A electrode 24 and a $1^{st}$-B electrode 25 which are located in a mutually electrically independent way, and an insulating layer 27 that provides a cover for them. On that insulating layer 27, there is an intermediate partition 29 positioned at a boundary site between the $1^{st}$-A electrode 24 and the $1^{st}$-B electrode 25. Another substrate 23 comprises a second electrode 26 on the side that faces the liquid confining space S. The side of the assembly 21 that faces the substrate 23 is a display viewing side, and at least the substrate 23 is transparent. On the outside of the substrate 23, there is a light block film 30 located, a site with no light block film 30 found defining a pixel segment 12 and a site with the light block film 30 found defining a space segment 13.

Figure 3A:
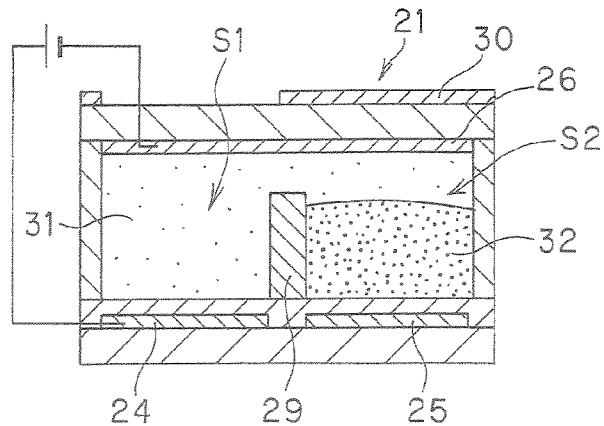
FIGS. 3A, 3B 3C and 3D are illustrative of the operation of the display system according to the invention.
Figure 3B:
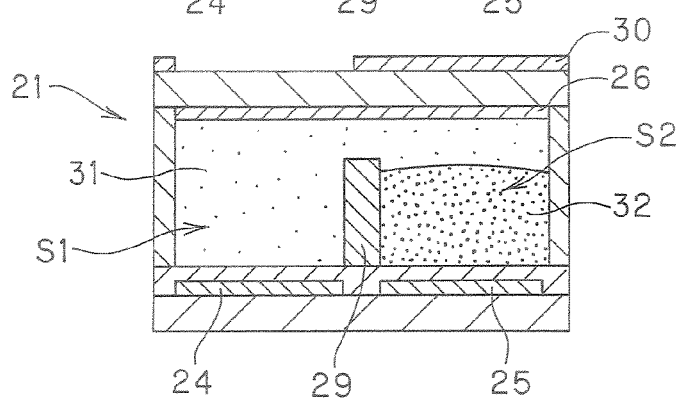
Figure 3C:
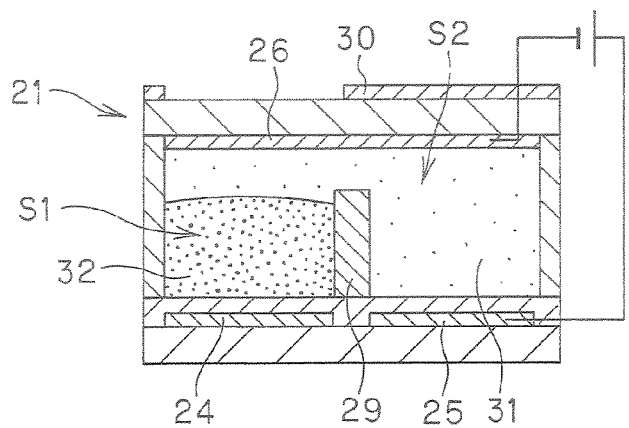
Figure 3D:
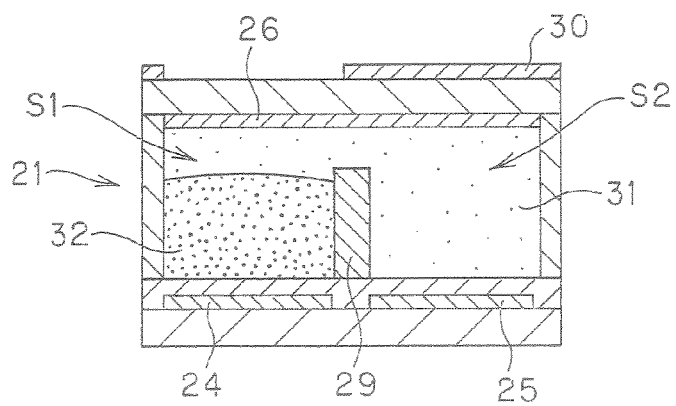

In the above display cell 11A, the $1^{st}$-A electrode 24 and the $1^{st}$-B electrode 25 are electrically insulated by the insulating layer 27 from the first liquid 31 and the second liquid 32. And then, as voltage is applied to the $1^{st}$-A electrode 24 and the second electrode 26, the second liquid 32 goes over the intermediate partition 29, migrating into a liquid confining space S2 on the $1^{st}$-B electrode 25, as shown in FIG. 3A. In this state, as the applied voltage is shut off, the intermediate partition 29 works as a liquid retainer means, so that the second liquid 32 that has migrated into the liquid confining space S on the $1^{st}$-B electrode 25 is retained intact, producing memory capability (FIG. 3B). As voltage is applied to the $1^{st}$-B electrode 25 and the second electrode 26, the second liquid 32 goes over the intermediate partition 29, migrating into a liquid confining space S1 on the $1^{st}$-A electrode 24 (FIG. 3C). In this state, as the applied voltage is shut off, the intermediate partition 29 works as a liquid retainer means, so that the second liquid 32 that has migrated into the liquid confining space S1 on the $1^{st}$-A electrode 24 is retained intact, producing memory capability (FIG. 3D). Such display cell 11A is capable of producing on/off displays depending on whether or not there is the second liquid 32 positioned on the electrode surface (the $1^{st}$-A electrode 24) of the site with no light block film 30 found (the pixel segment 12).

It is here appreciated that the area and configuration of the $1^{st}$-A electrode 24 and the $1^{st}$-B electrode 25, and the volume and configuration of the liquid confining space S1 on the $1^{st}$-A electrode 24 and the liquid confining space S2 on the $1^{st}$-B electrode 25 may or may not be identical with one another.

The substrate 23 that forms a part of the display cell 11A, because of being positioned on the display viewing side as described above, should be transparent. When the display cell 11A works on a reflection mode, it is not necessary for the opposite substrate 22 to be transparent; however, when the display cell 11A operates on a transmission mode, that opposite substrate 22 must be transparent. For the substrate 22, 23, for instance, a transparent substrate such as a glass or transparent resin substrate could be used. When it is not necessary for the substrate 22 to be transparent, use may be made of a metal substrate, a ceramic substrate, an opaque glass substrate that is roughened at a surface facing away from an electrode-formation surface or provided with a metal film by means of vapor deposition, an opaque resin substrate incorporated with a dye or pigment, etc. The thickness of the substrate 22, 23 could be determined while taking what is used for it, etc. into account. For instance, an appropriate selection could be made from the range of 10 µm to 5 mm, and preferably 100 µm to 2 mm.

The $1^{st}$-A electrode 24, the $1^{st}$-B electrode 25 and the second electrode 26 that form a part of the display cell 11A are connected to voltage application units (not shown), respectively, and operate such that electrode charges are optionally controllable in the applied voltage range of, for instance, 1 to 100 V. Positioned on the display viewing side, the second electrode 26 could be provided in the form of a transparent electrode formed of, for instance, indium tin oxide (ITO) zinc oxide (ZnO), and tin oxide (SnO) by means of general film-formation techniques such as sputtering vacuum vapor deposition, and CVD technique. The second electrode 26 could be such that the first liquid 31 is at a potential nearly equal to that of the second electrode 26; for instance, it could be formed of not only the planar electrode as described above, but also at least one needle or mesh electrode provided within the liquid confining space S as an example. When the display cell 11A operates on a transmission mode, the $1^{st}$-A electrode 24 and the $1^{st}$-B electrode 25 should be transparent as is the case with the second electrode 26. When the display cell 11A works on a reflection mode, on the other hand, the $1^{st}$-A electrode 24, and the $1^{st}$-B electrode 25 may be a metal electrode such as a Cu, Ag, Au or Al one, not a transparent one.

It is here noted that there could just as easily be a thin film provided on the second electrode 26 that faces the liquid confining space S. In this case, the wettability of the second liquid 32 to that thin film could be smaller than that of the second liquid 32 to the insulating layer 27. This is helpful for prevention of adhesion of the second liquid 32 to the second electrode 26, and for improvements in the wet spreading of the first liquid 31. Referring to the magnitude of the above wettability, the contact angle of a droplet of the second liquid is measured with a contact angle meter, and a smaller wettability here is defined by a larger contact angle.

For the insulating layer 27 that forms a part of the display cell 11A, use could be made of insulating materials such as polyimide resin, $SiO_2$, $SiN_4$, acrylic resin, fluororesin, polyamide resin, polyethylene terephthalate, polypropylene, polystyrene, silicone resin, quartz, epoxy resin, polyethylene, and polytetrafluoro-ethylene with or without trace currents passing through them. Among others, it is preferable to use a lipophilic insulating material such as polyimide resin, $SiO_2$, acrylic resin or silicone resin, because of having improved wettability to the second liquid 32, so leading to improvements in the thickness uniformity of the second liquid 32. The term "lipophilic" here is understood to mean that a droplet of tetrachloroethane has a contact angle of up to 20°, and preferably up to 10° as measured with a contact angle meter.

It is here appreciated that when the display cell 11A works on a transmission mode, a transparent insulating material is selected from the foregoing for the insulating layer 27.

For the wall portion 23 that forms a part of the display cell 11A, use could be made of resin materials such as ultraviolet curable urethane acrylate resin, epoxy resin, epoxy acrylate resin, ester acrylate resin, acrylate resin, thermosetting phenol resin, melamine resin, polyester resin, epoxy resin, polyurethane resin, polyimide resin, and urea resin. The liquid confining space S defined by the cooperation of the wall portion 28 with the opposite substrates 22 and 23 could be set to the range of, for instance, 1 to 1,000 μm.

It is here noted that the wettability of the first liquid 31 to the wall portion 28 could be larger than that of the first liquid 31 to the insulating layer 27 that provides a cover for the $1^{st}$-A electrode 24 and the $1^{st}$-B electrode 25. By doing so, it is possible to prevent the second liquid 32 from deflecting toward the wall portion 28 of the liquid confining space S.

The intermediate partition 29 that forms a part of the display cell 11A is a liquid retainer mean, and has a height such that when the applied voltage is shut off, the second liquid resting on the $1^{st}$-A electrode 24 or the $1^{st}$-B electrode 25 does not go over it. While the intermediate partition 29 is configured into a rectangular shape in section as typically shown, it is appreciated that it may vary in sectional width from site to site, its upper end may be formed of a curved surface rather than a planar surface, its upper end may be of a pointed shape, etc. Such intermediate partition 29 could be formed by the lamination of a photosensitive film at a desired thickness, followed by use of a photolithography technique or a 2P technique (a photo-polymerization process wherein a liquid ionizing radiation curable resin is coated on the surface of a master plate blank, then configured by extrusion under pressure, and finally cured by irradiation with ionizing radiation), and optionally made up of a material selected from the above materials for the wall portion 28.

The first liquid 31 to be filled in the assembly 21 is an electrically conductive or polar liquid such as water, an alcohol or an acid. On the other hand, the second liquid 32 is a hydrophobic liquid for which use could be made of oils such as heptane, hexane, nonane, decane, octane, dodecane, tetradecane, octadecane, hexadecane, dodecyldecane, ethylene glycol monobutyl ether acetate, diethylene glycol monobutyl ether acetate, and ethyl benzoate. Between the specific gravity g1 of the first liquid 31 and the specific gravity g2 of the second liquid 32, there should preferably be a relation of $g1 \leqq g2$.

In the invention, the second liquid 32 could be colored oil whereby information or the like could be displayed in a desired color.

When the display cell 11A operates on a transmission mode, the first liquid 31 could be a colored liquid while the second liquid 32 is a light blocking black oil, whereby on/off displays could be generated in two colors, a color transmitting through the colored liquid 31 and black.

There is no particular limitation on the light block film 30 that forms a part of the display cell 11A; a light blocking resin film and a metal film could be used alone or in combination. The light block film 30 could also be colored in a desired color.

Figure 4:
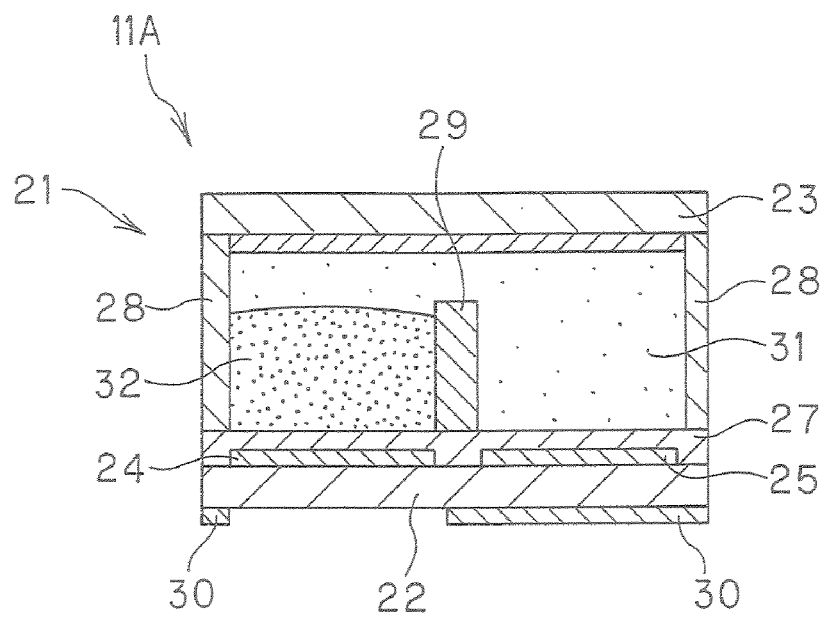
FIG. 4 is illustrative in section of another embodiment of the display system according to the invention.

The display cell 11A is not always limited to the above structure. The display cell 11A could have a structure wherein its side facing the substrate 22 is a viewing side and the light block film 30 is provided on the outside of the substrate 22, as shown typically in FIG. 4. In this case, the substrate 22 is transparent, and so are the $1^{st}$-A electrode 24, the $1^{st}$-B electrode 25 and the insulating layer 27. With the display cell 11A working on a transmission mode, the substrate 23 and the second electrode 26 are transparent, too. With no light block film 30 provided, displays could be generated by virtue of displacements of the first and second liquid 31 and 32 due to their movement.

Figure 5:
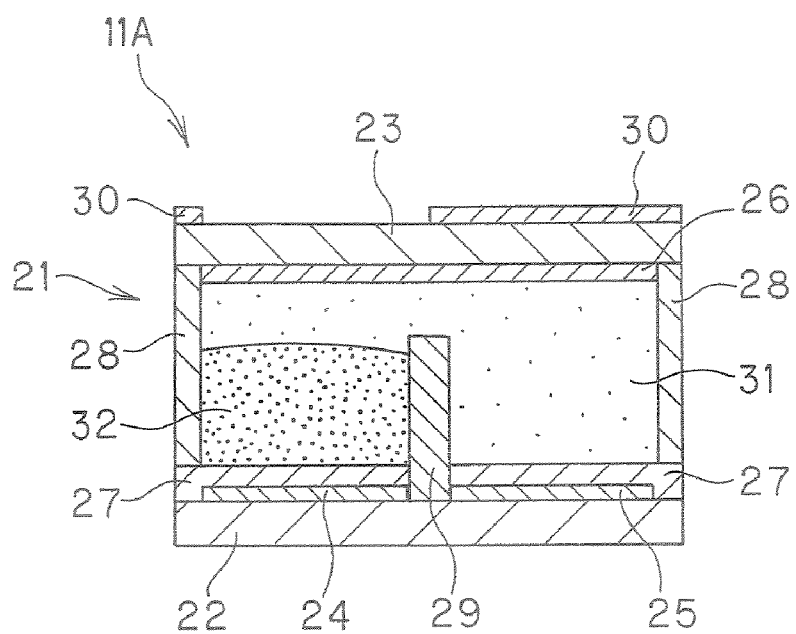
FIG. 5 is illustrative in section of yet another embodiment of the display system according to the invention.

Alternatively, use could be made of a structure wherein the intermediate partition 29 is directly formed on the substrate 23, as shown in FIG. 5.

The display cell forming the display system of the invention is not always limited to such structure as to provide displays of numeric information of "0" to "9" or the like as shown in FIG. 1. For instance, when the display cell operates on a reflection mode, a plurality of display cells, each using the oil colored in any one of yellow, magenta and cyan as the second liquid, could be arrayed in a matrix or other form for reflection-mode full-color displays. On the other hand, when the display cell works on a transmission mode with a colored liquid as the first liquid 31 and a light blocking black oil as the second liquid 32, a plurality of display cells, each using any one of red, green and blue liquids as the above colored liquid 31, could be arrayed in a matrix or other form for transmission-mode full-color displays.

A plurality of unit cells, each having the $1^{st}$-A electrode 24 and the $1^{st}$-B electrode 25 in the same location and configuration, could be arrayed in a matrix or other form, whereby consistent display performance could be achieved throughout the display system even in the absence of, for instance, the light block film 30.

Second Embodiment

Figure 6:
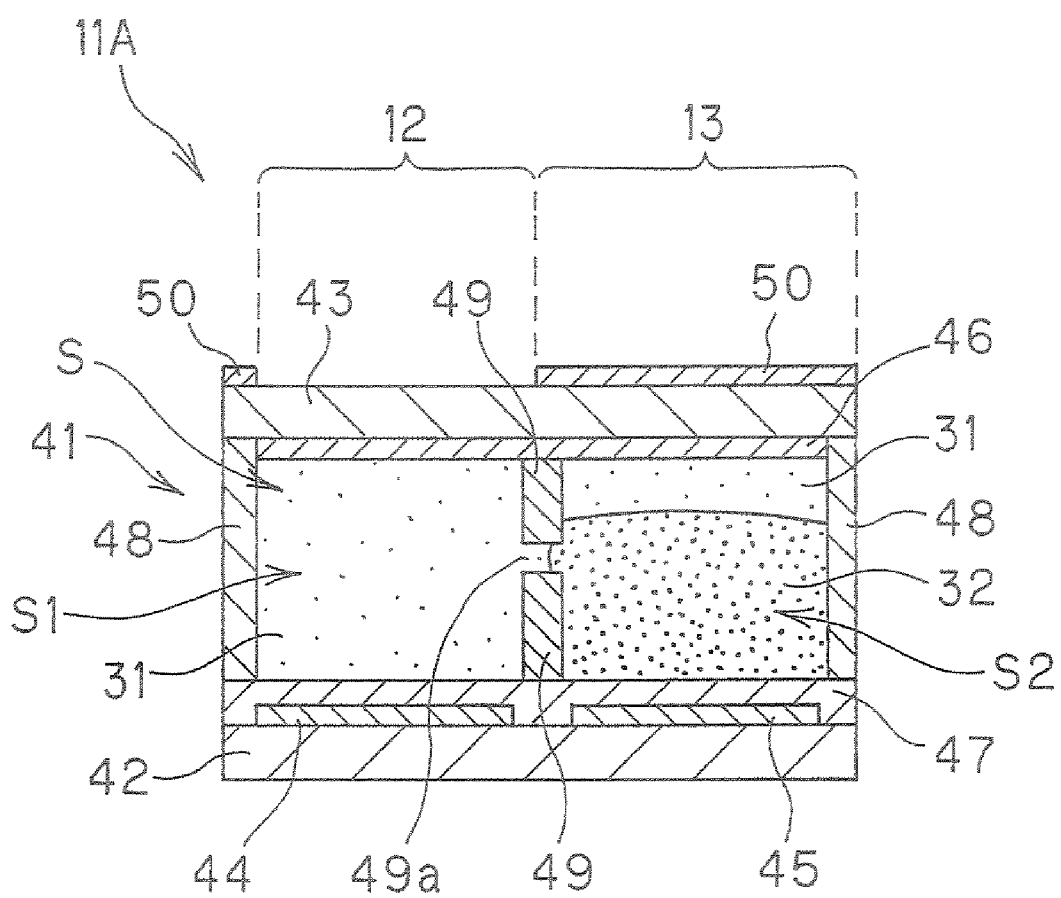
FIG. 6 is illustrative in longitudinal section, as in FIG. 2, of a further embodiment of the display system according to the invention.

FIG. 6 is illustrative, as in FIG. 2, of the second embodiment of the display system according to the invention, and indicative of the structure of one display cell. According to the embodiment of FIG. 6, in an assembly 41 of a display cell 11A, there are an electrically conductive or polar, first liquid 31 and a hydrophobic, second liquid 32 filled.

The assembly 41 comprises a set of substrates 42 and 43 and a wall portion 48 for supporting them in opposition to one another to define a liquid confining space S. On a side that faces the liquid confining space S, one substrate 42 comprises a $1^{st}$-A electrode 44 and a $1^{st}$-B electrode 45 which are located in a mutually electrically independent way, and an insulating layer 47 that provides a cover for them. On that insulating layer 47, there is an intermediate partition 49 positioned at a boundary site between the $1^{st}$-A electrode 44 and the $1^{st}$-B electrode 45 in such a way as to divide the liquid confining space S. Another substrate 43 comprises a second electrode 46 on the side that faces the liquid confining space S, and another end of the above intermediate partition 49 is joined to the substrate 43. The above intermediate partition 49 has an opening 49a that provides a liquid flow path. The side of the assembly 41 that faces the substrate 43 is a display viewing side, and at least the substrate 43 is transparent. On the outside of the substrate 43, there is a light block film 50 located, a site with no light block film 50 found defining a pixel segment 12 and a site with the light block film 50 found defining a space segment 13.

In the above display cell 11A, the $1^{st}$-A electrode 44 and the $1^{st}$-B electrode 45 are electrically insulated by the insulating layer 47 from the first liquid 31 and the second liquid 32. And then, as voltage is applied to the $1^{st}$-B electrode 45 and the second electrode 46, the second liquid 32 goes through the opening 49a in the intermediate partition 49, migrating into a liquid confining space S1 on the $1^{st}$-A electrode 44, as shown in FIG. 7A. In this state, as the applied voltage is shut off, the intermediate partition 49 works as a liquid retainer means so that the second liquid 32 that has migrated into the liquid confining space S1 on the $1^{st}$-A electrode 44 is retained intact, producing memory capability (FIG. 7B). As voltage is applied to the $1^{st}$-A electrode 44 and the second electrode 46, the second liquid 32 goes through the opening 49*a* in the partition 49, migrating into a liquid confining space S2 on the $1^{st}$-B electrode 45 (FIG. 7C). In this state as the applied voltage is shut off, the intermediate partition 49 works as a liquid retainer means, so that the second liquid 32 that has migrated into the liquid confining space S2 on the $1^{st}$-B electrode 45 is retained intact producing memory capability (FIG. 7D). Such display cell 11A is capable of producing on/off displays depending on whether or not there is the second liquid 32 positioned on the electrode surface (the $1^{st}$-A electrode 44) of the site with no light block film 50 found (the pixel segment 12).

It is here appreciated that the area and configuration of the $1^{st}$-A electrode 44 and the $1^{st}$-B electrode 45, and the volume and configuration of the liquid confining space S1 on the $1^{st}$-A electrode 44 and the liquid confining space S2 on the $1^{st}$-B electrode 45 may be identical with, or different from, one another.

Figure 8A:
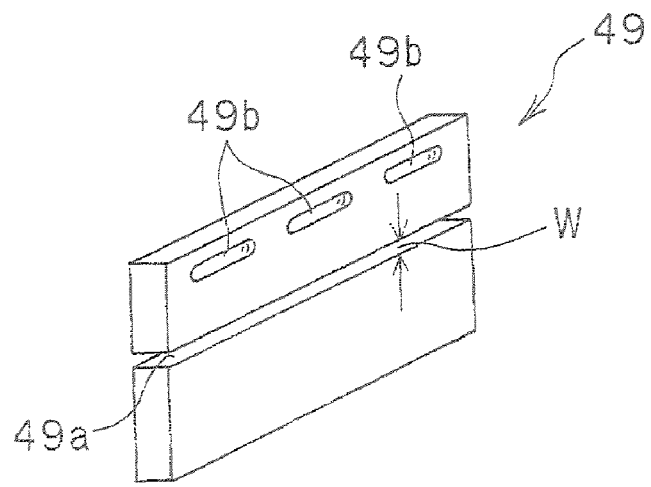
FIGS. 8A, 8B and 8C are illustrative in perspective of examples of the intermediate partition that forms a part of the display system according to the invention.
Figure 8B:
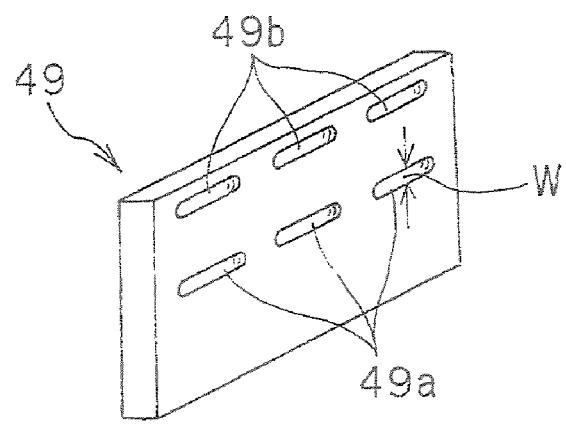
Figure 8C:
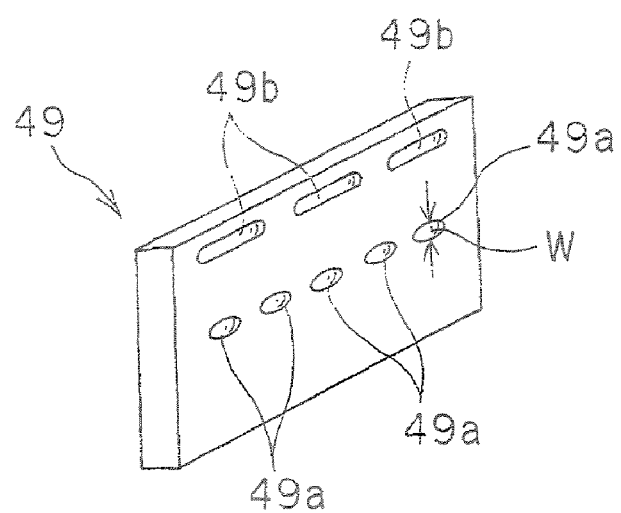

The intermediate partition 49 that forms a part of the display cell 11A is the liquid retainer means, and there is no particular limitation on the opening 49*a* that provides a liquid flow path; for instance, that opening could be such a slit-form opening as depicted in FIG. 8A, multiple such elliptic openings as depicted in FIG. 8B, and multiple such oval openings as depicted in FIG. 8C. However, it is desired that the width W of the opening 49*a* be in the range of 1 to 1,000 μm, and preferably 1 to 100 μm. As the opening width W is less than 1 μm, there is an increased resistance with which the second liquid 32 passes through the opening 49*a*, and at greater than 1,000 μm, the intermediate partition 40 often loses its own liquid retainer function.

Referring again to FIGS. 8A, 8B and 8C, it is noted that apart from the opening 49*a*, the intermediate partition 49 is provided with an opening 49*b* that makes it easy for the first liquid 31 to go through the intermediate partition 49 in a direction opposite to that of the second liquid. When such opening 49*b* is in contact with the level of the second liquid 32 while the intermediate partition 49 functions as the liquid retainer means, it is desired that the opening width W be in the range of 1 to 1,000 μm and preferably 1 to 100 μm, as is the case with the above opening 49*a*. However, there is no limitation on how many openings 49*b* are used, and what configuration they are used in. The total area of the opening 49*a* in the intermediate partition 49 could be optionally determined while taking the flowability, etc of the second liquid 31 and the second liquid 32 into account.

The assembly 41 comprising such intermediate partition 49, especially the one having such slit-form opening 49*a* as depicted in FIG. 8A, could be formed by providing the substrates 42 and 43 with partition members then forming the opening 49*b* through the partition member on the side of the substrate 43 by means of laser processing, machining or the like, and finally positioning the substrates 42 and 43 in such a way as to arrange the ends of the partition members in opposition to one another via a desired gap (the opening 49*a*). In the case, the formation of the partition members to the substrates 42 and 43 could be achieved as is the case with the above intermediate partition 29. The assembly 41 having the intermediate partition 49 configured as in FIG. 3B or 8C could be formed by forming the intermediate partition 49 on one substrate as is the case with the above intermediate partition 29, then forming the opening 49*a*, 49*b* by means of laser processing machining or the like, and finally engaging the end of the intermediate partition 49 with another substrate thereby supporting the substrates 42 and 43 in opposition to one another. The intermediate partition 49 for instance could be formed of a material selected from the materials for the above intermediate partition 29.

The substrates 42, 43 the $1^{st}$-A and $1^{st}$-B electrodes 44 and 45 and the second electrode 46 could be similar to the substrates 22, 23 the $1^{st}$-A and $1^{st}$-B electrodes 24 and 25, and the second electrode 26 so their explanation is here saved. It is here noted that there could just as easily be a thin-film provided on the second electrode 46 that faces the liquid confining space S. In this case, the wettability of the second liquid 32 to that thin film could be smaller than that of the second liquid 32 to the insulating layer 47. This is helpful for prevention of adhesion of the second liquid 32 to the second electrode 46 and for improvements in the wet spreading of the first liquid 31.

The insulating layer 47, the wall portion 48 and the light block film 50, too, could be similar to the insulating layer 27, the wall portion 28 and the light block film 30 in the foregoing embodiment, so their explanation is here saved. It is here noted that the wettability of the first liquid 31 to the wall portion 48 could be larger than that of the first liquid 31 to the insulating layer 47 that provides a cover for the $1^{st}$-A electrode 44 and the $1^{st}$-B electrode 45. By doing so, it is possible to prevent the second liquid 32 from deflecting toward the wall portion 48 of the liquid confining space S.

The first liquid 31 to be filled in the assembly 41 could be similar to the first liquid 31 to be filled in the assembly 21 in the foregoing embodiment.

On the other hand, the second liquid 32 to be filled in the assembly 41 could be similar to the second liquid 32 to be filled in the assembly 21 in the foregoing embodiment, and for that, use could be made of oils such as dodecyldecane, methyl glycol acetate, ethyl benzoate, and glycerin acetate, each having a surface tension at 20° C. of 10 to 73 dyne/cm, and preferably 15 to 70 dyne/cm. The use of such oil ensures that the intermediate partition 49 functions more as a liquid retainer means. The "surface tension" here is worked out from a measurement obtained by measuring a droplet on a solid with a contact angle meter. It is here preferable that between the specific gravity g1 of the first liquid 31 and the specific gravity g2 of the second liquid 32, there is a relation of g1≦g2.

In the invention, the second liquid 32 could be a colored oil whereby information or the like could be displayed in a desired color.

When the display cell 11A operates on a transmission mode, the first liquid 31 could be a colored liquid while the second liquid 32 is a black oil having light block capability, whereby on/off displays could be generated in two colors a color transmitting through the colored liquid 31 and black.

The display cell 11A is not always limited to the above structure. The display cell 11A could have a structure wherein its side facing the substrate 42 is a viewing side and the light block film 50 is provided on the outside of the substrate 42. In this case, the substrate 42 is transparent, and so are the $1^{st}$-A electrode 44, the $1^{st}$-B electrode 45 and the insulating layer 47. With the display cell 11A working on a transmission mode, the substrate 43 and the second electrode 46 are transparent, too. With no light block film 50 provided, displays could be generated by virtue of displacements of the first and second liquid 31 and 32 due to their movement. Alternatively, use could be made of a structure wherein the intermediate partition 49 is directly formed on the substrate 43.

The display cell forming the display system of the invention is not always limited to such structure as to provide displays of numeric information of "0" to "9" or the like as shown in FIG. 1. For instance, when the display cell operates on a reflection mode, a plurality of display cells, each using the oil colored in any one of yellow, magenta and cyan as the second liquid, could be arrayed in a matrix or other form for reflection-mode full-color displays. On the other hand, when the display cell works on a transmission mode with a colored liquid as the first liquid 31 and a light block black oil as the second liquid 32, a plurality of display cells, each using any one of red, green and blue liquids as the above colored liquid 31 could be arrayed in a matrix or other form for transmission-mode full-color displays.

A plurality of unit cells, each having the $1^{st}$-A electrode 44 and the $1^{st}$-B electrode 45 in the same location and configuration, could be arrayed in a matrix or other form, whereby consistent display performance could be achieved throughout the display system even in the absence of, for instance, the light block film 50.

Third Embodiment

Figure 9:
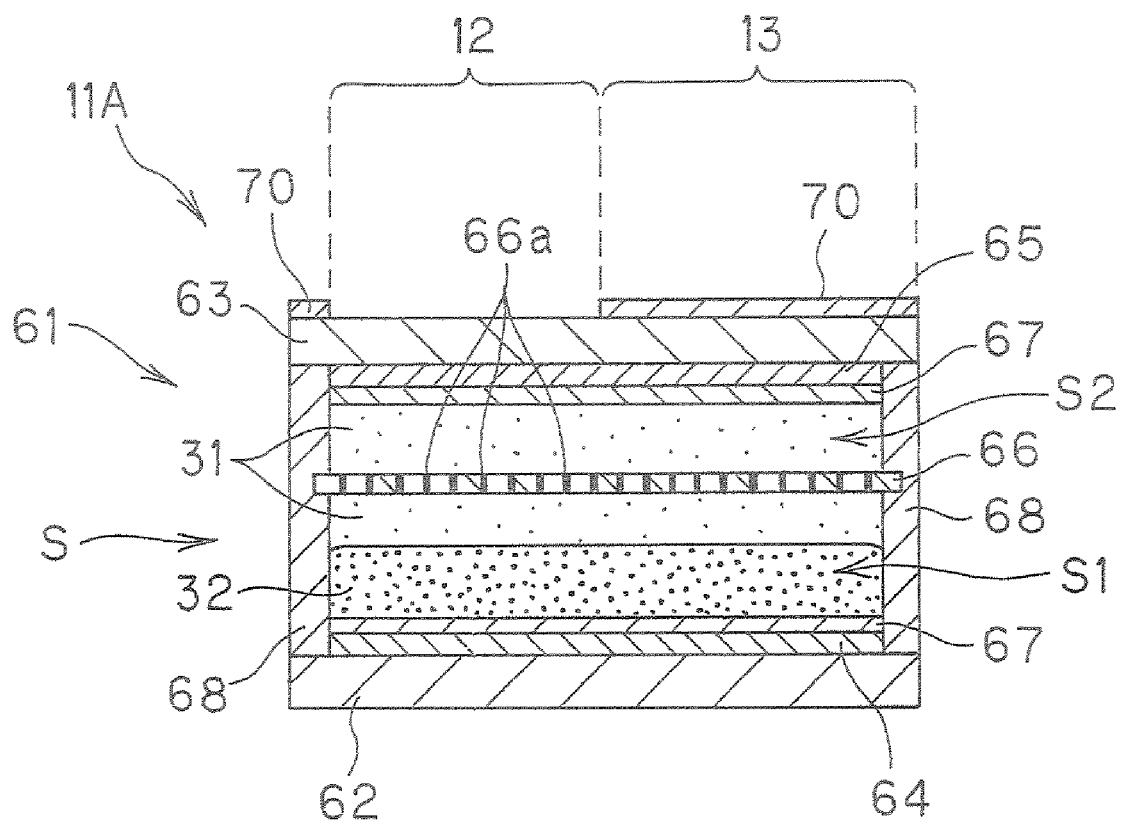
FIG. 9 is illustrative in longitudinal section as in FIG. 2, of a further embodiment of the display system according to the invention.

FIG. 9 is illustrative, as in FIG. 2, of the third embodiment of the display system according to the invention, and indicative of the structure of one display cell. According to the embodiment of FIG. 9, in an assembly 61 of a display cell 11A, there are an electrically conductive or polar, first liquid 31 and a hydrophobic, second liquid 32 filled.

The assembly 61 comprises a set of substrates 62 and 63 and a wall portion 68 for supporting them in opposition to one another to define a liquid confining space S. On a side that faces the liquid confining space S, one substrate 62 comprises a $1^{st}$-A electrode 64, and an insulating layer 67 that provides a cover for it. Another substrate 63 comprises a $1^{st}$-B electrode 65 located on a side that faces the liquid confining space S, and an insulating layer 67 that provides a cover for it. Further there is a second electrode 66 located, which is positioned substantially parallel with the $1^{st}$-A electrode 64 and the $1^{st}$-B electrode 65 and located in such a way as to divide the liquid confining space S. This second electrode 66 has a plurality of through-holes 66a that provide a liquid flow path, and works also as a liquid retainer means. The side of the assembly 61 that faces the substrate 63 is a display viewing side, and at least the substrate 63 is transparent. On the outside of the substrate 63, there is a light block film 70 located, a site with no light block film 70 found defining a pixel segment 12 and a site with the light block film 70 found defining a space segment 13. In the embodiment illustrated, the through-holes 66a are indicated by bold lines for convenience.

Figure 10A:
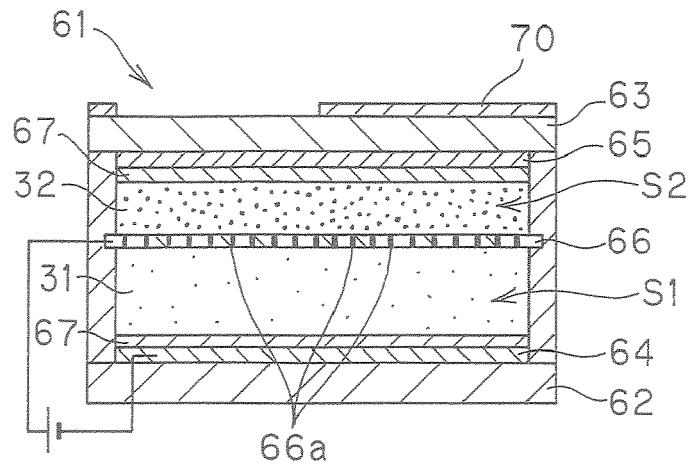
FIGS. 10A, 10B, 10C and 10D are illustrative of the operation of the display system according to the invention.
Figure 10B:
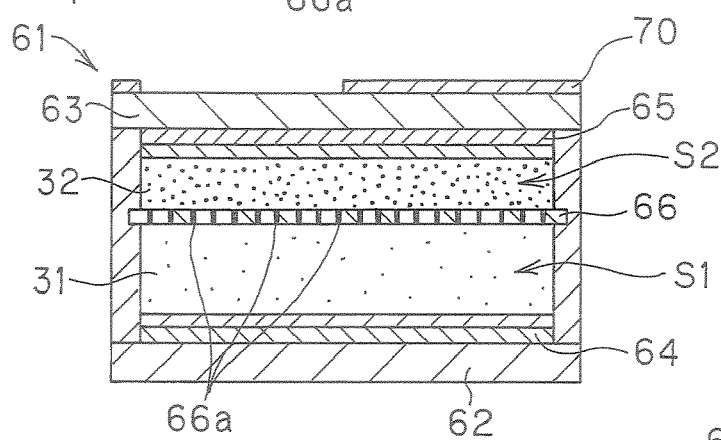
Figure 10C:
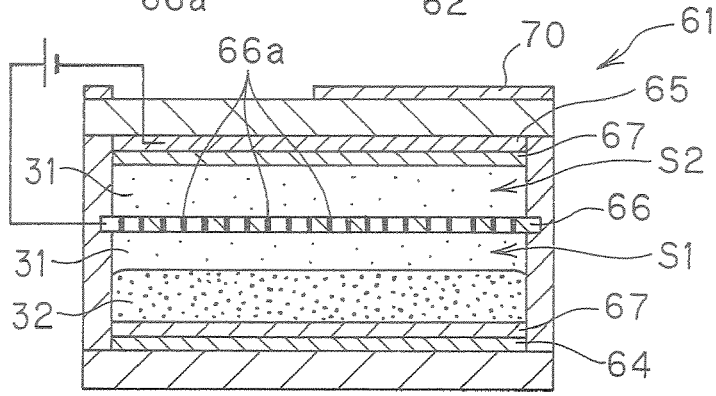
Figure 10D:
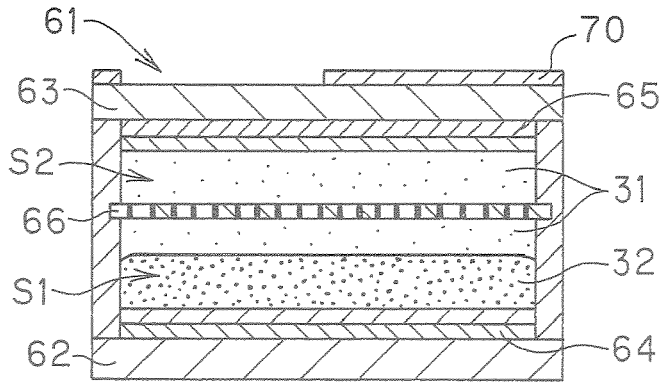

In the above display cell 11A, the $1^{st}$-A electrode 64 and the $1^{st}$-B electrode 65 are electrically insulated by insulating layers 67, 67 from the first liquid 31 and the second liquid 32. And then, as voltage is applied to the $1^{st}$-A electrode 64 and the second electrode 66, the second liquid 32 goes through the openings 66a in the second electrode 66, migrating into a liquid confining space S2 on the $1^{st}$-B electrode 65, as shown in FIG. 10A. In this state, as the applied voltage is shut off, the second electrode 66 works as a liquid retainer means, so that the second liquid 32 that has migrated into the liquid confining space S2 on the $1^{st}$-B electrode 65 is retained intact, producing memory capability (FIG. 10B). As voltage is applied to the $1^{st}$-B electrode 65 and the second electrode 66, the second liquid 32 goes through the openings 66a in the second electrode 66, migrating into a liquid confining space S1 on the $1^{st}$-A electrode 64 (FIG. 10C). In this state, as the applied voltage is shut off, the second electrode 66 works as a liquid retainer means, so that the second liquid 32 that has migrated into the liquid confining space S on the $1^{st}$-A electrode 64 is retained intact, producing memory capability (FIG. 10D). With display cell 11A, in a state where the second liquid 32 is retained in the liquid confining space S2 on the $1^{st}$-B electrode 65 side (FIG. 10B), the color of the second liquid 32 is seen from the pixel segment 12, and in a state where the second liquid 32 is retained in the liquid filling state S1 on the $1^{st}$-A electrode 64 side (FIG. 10D), the color of the first liquid 31 or the color of the second electrode 66 is seen, whereby on/off displays can be viewed.

It is here appreciated that the volume of the liquid confining space S1 on the $1^{st}$-A electrode 64 side may or may not be identical with that of the liquid confining space S2 on the $1^{st}$-B electrode 65 side.

The substrates 62 and 63 that forms a part of the display cell 11A could be similar to the substrates 22 and 23 in the foregoing embodiments, so their explanation is saved.

The $1^{st}$-A electrode 64 the $1^{st}$-B electrode 65 and the second electrode 66 that form a part of the display cell 11A are connected to voltage application units (not shown), respectively, and operate such that electrode charges are optionally controllable in the applied voltage range of, for instance, 1 to 100 V. Positioned on the display viewing side, the $1^{st}$-B electrode 65 could be provided in the form of a transparent electrode formed of, for instance, indium tin oxide (ITO), zinc oxide (ZnO), and tin oxide (SnO) by means of general film-formation techniques such as sputtering, vacuum vapor deposition, and CVD technique. Like the $1^{st}$-B electrode 65 the st-A electrode 64 and the second electrode 66 could be transparent, and formed of an electrically conductive material such as Cu, Ag, Au or Al.

The second electrode 66 also functions as a liquid retainer means as described above, and each through-hole 66a should desirously has a width in the range of 1 to 1,000 μm, and preferably 1 to 100 μm. As the width W of the through-holes 66a is less than 1 μm, there is an increased resistance with which the second liquid 32 passes through the through-holes 66a, and at greater than 1,000 μm, the second electrode 66 often loses its own liquid retainer function. Such second electrode 66 could be in a mesh form, and the total area of the through-holes 66a in the second electrode 66 could be optionally determined while taking the flowability, etc of the first and second liquids 31 and 32 used into account.

Figure 11:
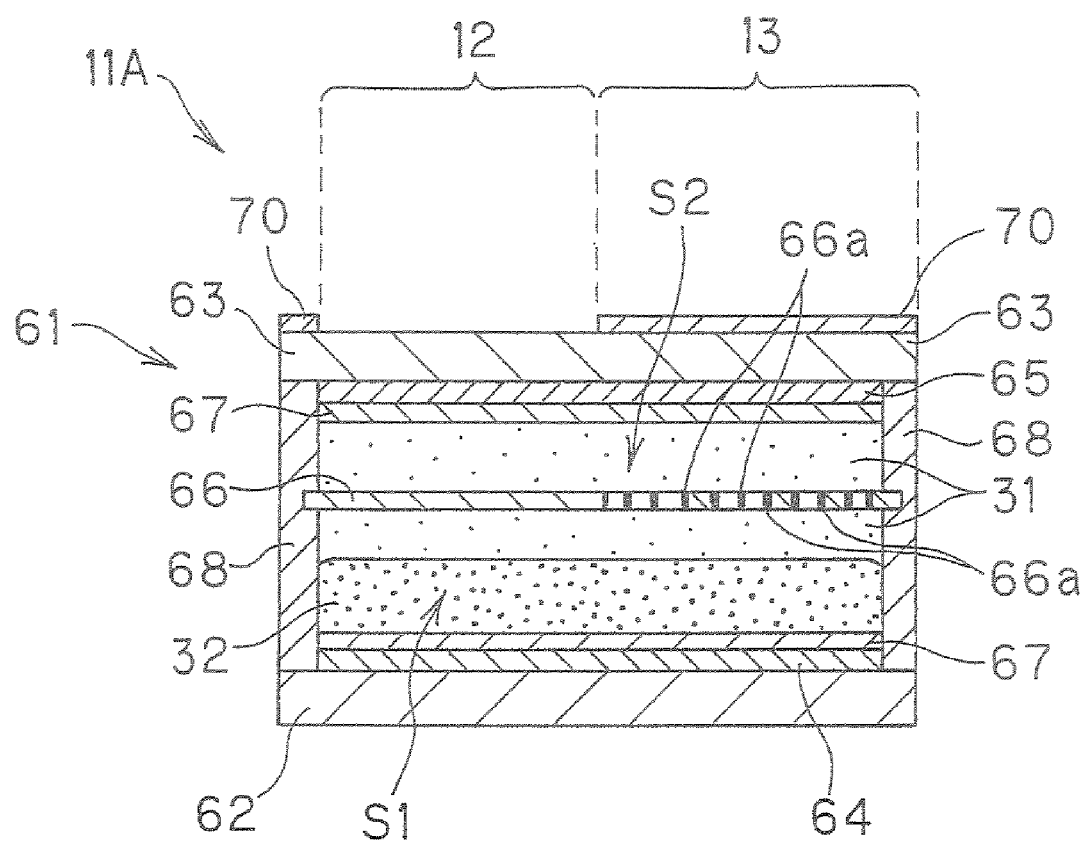
FIG. 11 is illustrative in section of a further embodiment of the display system according to the invention.

In the invention, as illustrated in FIG. 11, the second electrode 66 could just as easily be provided with a plurality of through-holes 66a in a region corresponding to the space segment 13. This ensures that in a state where, as described above, the second liquid 32 is retained in the liquid confining space S1 on the $1^{st}$-A electrode 64 side (FIG. 10D), a flat site of the second electrode 66 (with no through-holes found) is viewed from the pixel segment 12, resulting in visibility improvements.

It is here noted that there could be a thin film provided on the surface of the second electrode 66, and the wettability of the second liquid 32 to that thin film could be smaller than that of the second liquid 32 to the insulating layer 67. This is helpful for prevention of adhesion of the second liquid 32 to the second electrode 66, and for improvements in the wet spreading of the first liquid 31.

Although the insulating layers 67, 67 that form a part of the display cell 11A could be similar to the insulating layers 27 in the preceding embodiments, it is preferable that the insulating layer 67 on the substrate 63 side (on the $1^{st}$-B electrode 65) is in a transparent insulating layer form that is made up of a transparent insulating material selected from the above insulating materials.

The wall portion 68 and the light block film 70 that form a part of the display cell 11A could be similar to the wall portion 28 and the light block film 30 in the preceding embodiments, so their explanation is saved. It is appreciated that the wettability of the first liquid 31 to the wall portion 86 could be larger than that of the first liquid 31 to the insulating layer 67 that provides a cover for the 1$^{st}$-A and 1$^{st}$-B electrodes 64 and 65, thereby preventing the deflection of the second liquid 32 toward the wall portion 68 of the liquid confining space S.

The first liquid 31 to be filled in the assembly 61 could be similar to the first liquid 31 to be filled in the assembly 21 in the foregoing embodiment.

On the other hand, the second liquid 32 to be filled in the assembly 61 could be similar to the second liquid 32 to be filled in the assembly 21 in the foregoing embodiment, and for that, use could be made of oils such as dodecyldecane, ethylene glycol monobutyl ether acetate, diethylene glycol monobutyl ether acetate, and ethyl benzoate, each having a surface tension at 20° C. of 10 to 73 dyne/cm, and preferably 15 to 70 dyne/cm, thereby ensuring that the second electrode 66 functions more as a liquid retainer means. It is here preferable that between the specific gravity g1 of the first liquid 31 and the specific gravity g2 of the second liquid 32, there is a relation of $g1 \leq g2$.

In the invention, the second liquid 32 could be colored oil whereby information or the like could be displayed in a desired color.

The display cell 11A is not always limited to the above structure. For instance, the second electrode 66 could be provided by forming an electrically conductive film on an insulating substrate having through-holes 66a. In this case, the insulating substrate could be formed of insulating materials such as polyimide resin, $SiO_2$, $SiN_4$, acrylic resin, fluororesin, polyamide resin, polyethylene terephthalate, polypropylene, polystyrene, silicone resin, quartz, epoxy resin, polyethylene, and polytetrafluoro-ethylene.

Figure 12A:
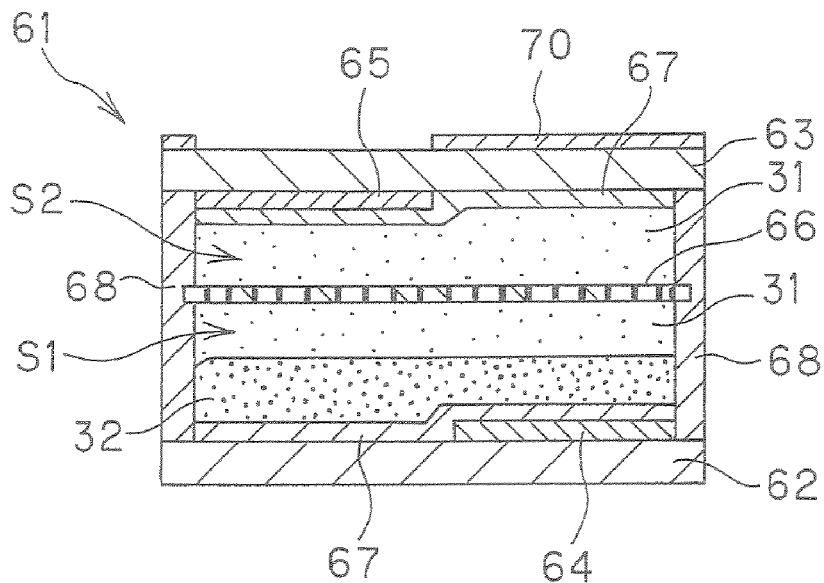
FIGS. 12A and 12B are illustrative of a further embodiment of the display system according to the invention.
Figure 12B:
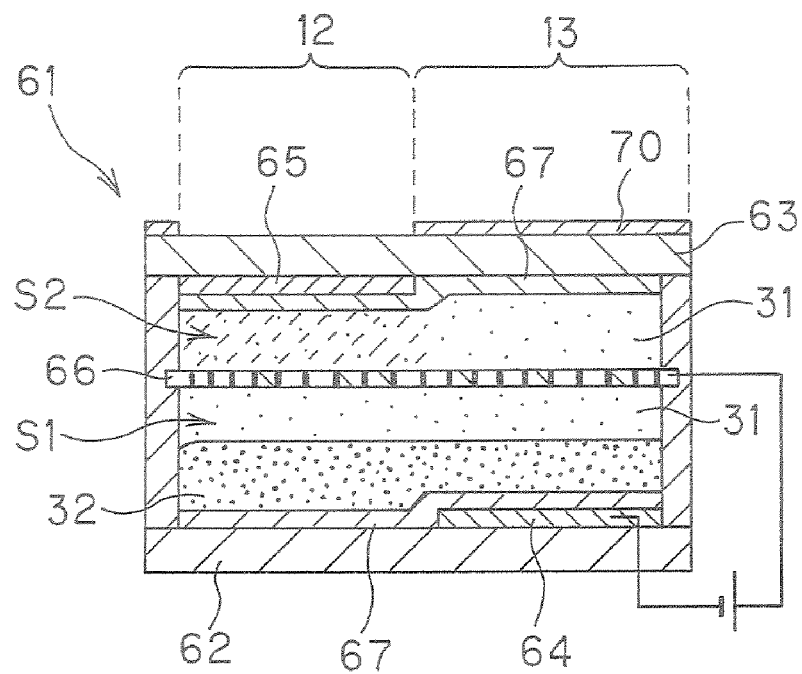

The 1$^{st}$-A electrode 64 and the 1$^{st}$-B electrode 65 could just as easily be provided in a desired pattern, rather than all over the surfaces of the substrates 62 and 63. As shown typically in FIG. 12A, the 1$^{st}$-A electrode 64 located on the substrate 62 could be provided in a pattern corresponding to the light block film 70, and the 1$^{st}$-B electrode 65 located on the substrate 63 could be provided in a pattern corresponding to a site with no light block film 70 formed. In such an arrangement, as voltage is applied (FIG. 12B) to between the 1$^{st}$-A electrode 64 and the second electrode 66 in a state where there is the second liquid 32 in the liquid confining space S1, the second liquid 32 goes through the through-holes 66a in the second electrode 66, migrating more into the region (indicated by broken oblique lines) of the pixel segment 12 in the liquid confining space S2. And thereafter, as voltage is applied to the 1$^{st}$-B electrode 65 and the second electrode 66, the second liquid 32 goes through the through-holes 66a in the second electrode 66, migrating more into the region of the space segment in the liquid confining space S1, leading to more effective migration of the first liquid 31 and the second liquid 32.

Figure 13:
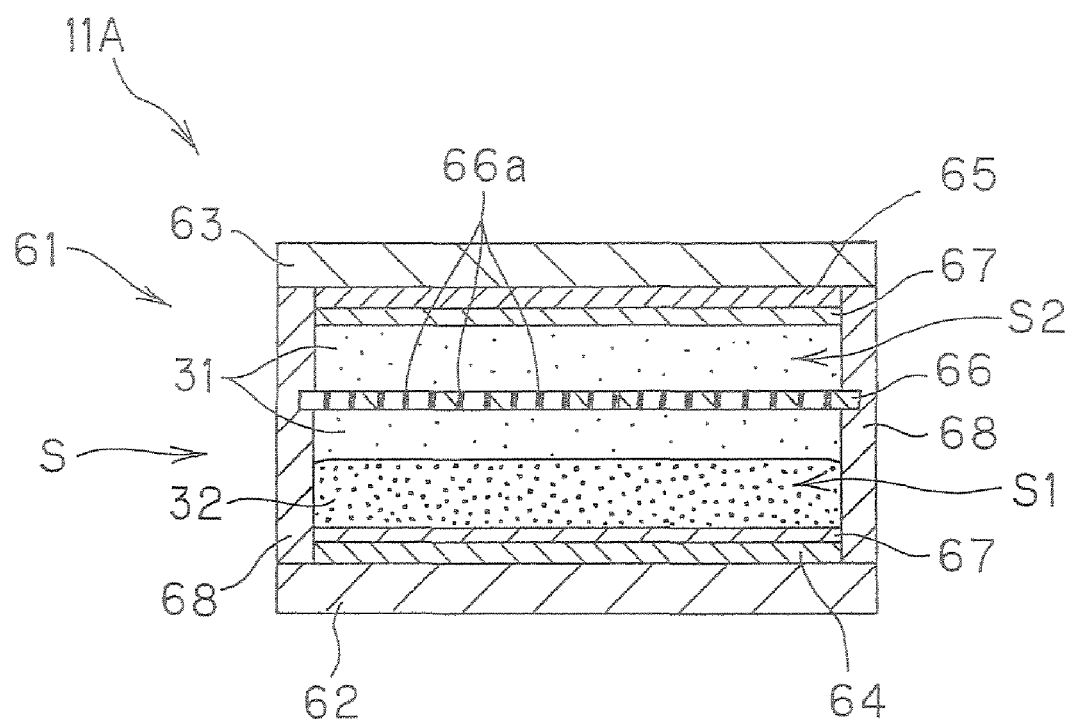
FIG. 13 is illustrative in section of a further embodiment of the display system according to the invention.

Further the display cell 11A could be configured in such a way as to have no light block layer 70, as shown in FIG. 13.

Still further, the display cell that forms a part of the display system of the invention is not always limited to such a structure as shown in FIG. 1, viz., the one capable of producing displays of numeric information "1" to "9". For instance, a plurality of display cells, each using any one of yellow, magenta and cyan-colored oils as the second liquid, are arrayed in a matrix or other form for reflection-mode full-color displays.

Fourth Embodiment

Figure 14:
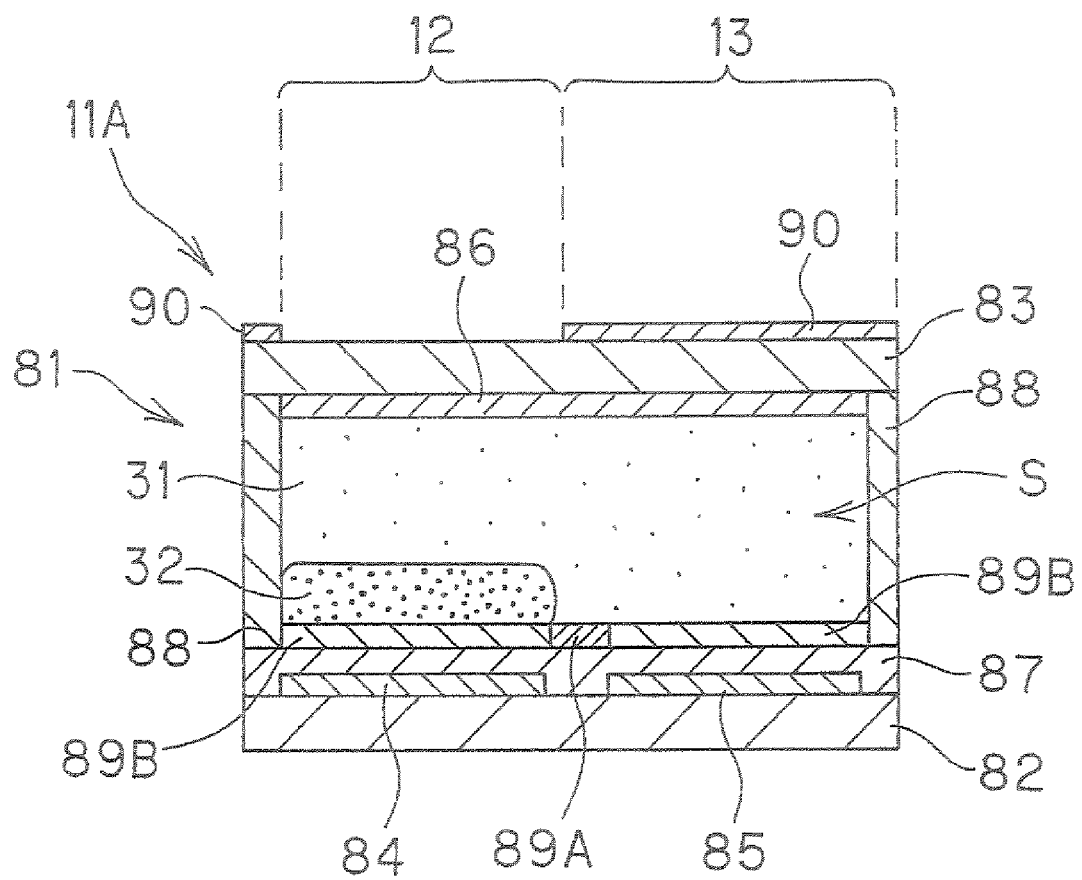
FIG. 14 is illustrative in longitudinal section, as in FIG. 2 of a further embodiment of the display system according to the invention.

FIG. 14 is illustrative, as in FIG. 2 of the fourth embodiment of the display system according to the invention, and indicative of the structure of one display cell. In the embodiment illustrated in FIG. 14, an electrically conductive or polar, first liquid 31 and a hydrophobic, second liquid 32 filled in an assembly 81 of the a display cell 11A.

The assembly 81 comprises a set of substrates 82 and 83 and a wall portion 88 for supporting them in opposition to one another to define a liquid confining space S. On a side that faces the liquid confining space S, one substrate 82 comprises a 1$^{st}$-A electrode 84 and a 1$^{st}$-B electrode 85 which are located in a mutually electrically independent way, and an insulating layer 87 that provides a cover for them. On that insulating layer 87 there is an oil repellent layer 89A positioned at a boundary site between the 1$^{st}$-A electrode 84 and the 1$^{st}$-B electrode 85 and there is a lipophilic layer 89B provided on a site with no oil repellent layer 89A formed. Another substrate 83 comprises a second electrode 26. The side of the assembly 81 that faces the substrate 83 is a display viewing side, and at least the substrate 83 is transparent. On the outside of the substrate 83, there is a light block film 90 located, a site with no light block film 90 found defining a pixel segment 12 and a site with the light block film 90 found defining a space segment 13.

Figure 15A:
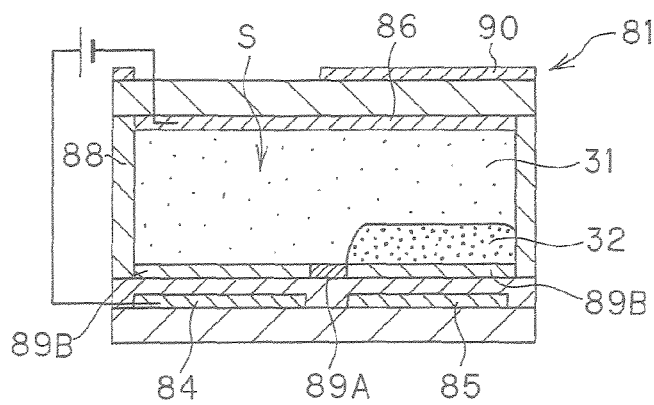
FIGS. 15A, 15B, 15C and 15D are illustrative of the operation of the display system according to the invention.
Figure 15B:
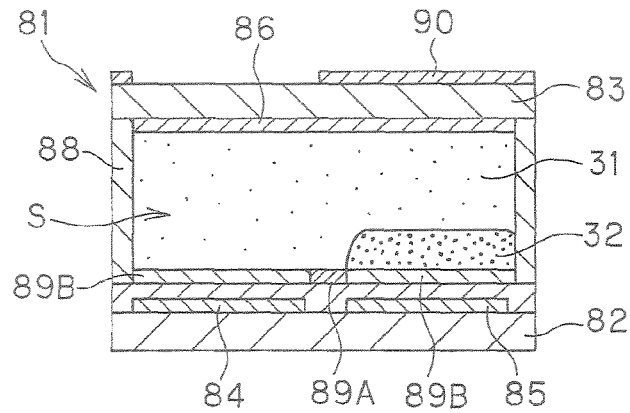
Figure 15C:
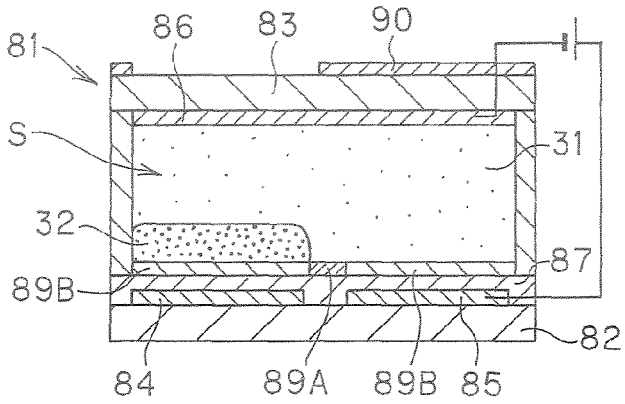
Figure 15D:
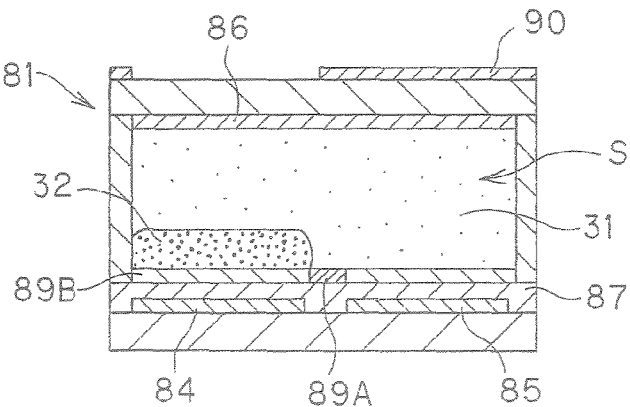

In the above display cell 11A, the 1$^{st}$-A electrode 84 and the 1$^{st}$-B electrode 85 are electrically insulated by the insulating layer 87 from the first liquid 31 and the second liquid 32. And then, as voltage is applied to the 1$^{st}$-A electrode 84 and the second electrode 86, the second liquid 32 goes over the oil repellent layer 89A, migrating onto the 1$^{st}$-B electrode 85 (the lipophilic layer 89B) as shown in FIG. 15A. In this state, as the applied voltage is shut off the oil repellent layer 89A works as a liquid retainer means, so that the second liquid 32 that has migrated onto the 1$^{st}$-B electrode 85 is retained intact, producing memory capability (FIG. 15B). As voltage is applied to the 1$^{st}$-B electrode 85 and the second electrode 86, the second liquid 32 goes over the oil repellent layer 89A, migrating onto the 1$^{st}$-A electrode 84 (lipophilic layer 89B) (FIG. 15a). In this state, as the applied voltage is shut off, the oil repellent layer 89A works as a liquid retainer means, so that the second liquid 32 that has migrated onto the st-A electrode 84 is retained intact, producing memory capability (FIG. 15D). Such display cell 11A is capable of producing on/off displays depending on whether or not there is the second liquid 32 positioned on the electrode surface (the 1$^{st}$-A electrode 84) of the site with no light block film 90 found (the pixel segment 12).

Where to locate the oil repellent layer 89A could be optionally determined relative to the 1$^{st}$-A electrode 84 and the 1$^{st}$-B electrode 85, and the area and configuration of the lipophilic layer 89B on the 1$^{st}$-A electrode 84 and the 1$^{st}$-B electrode 85 may or may not be identical with one another.

Figure 16:
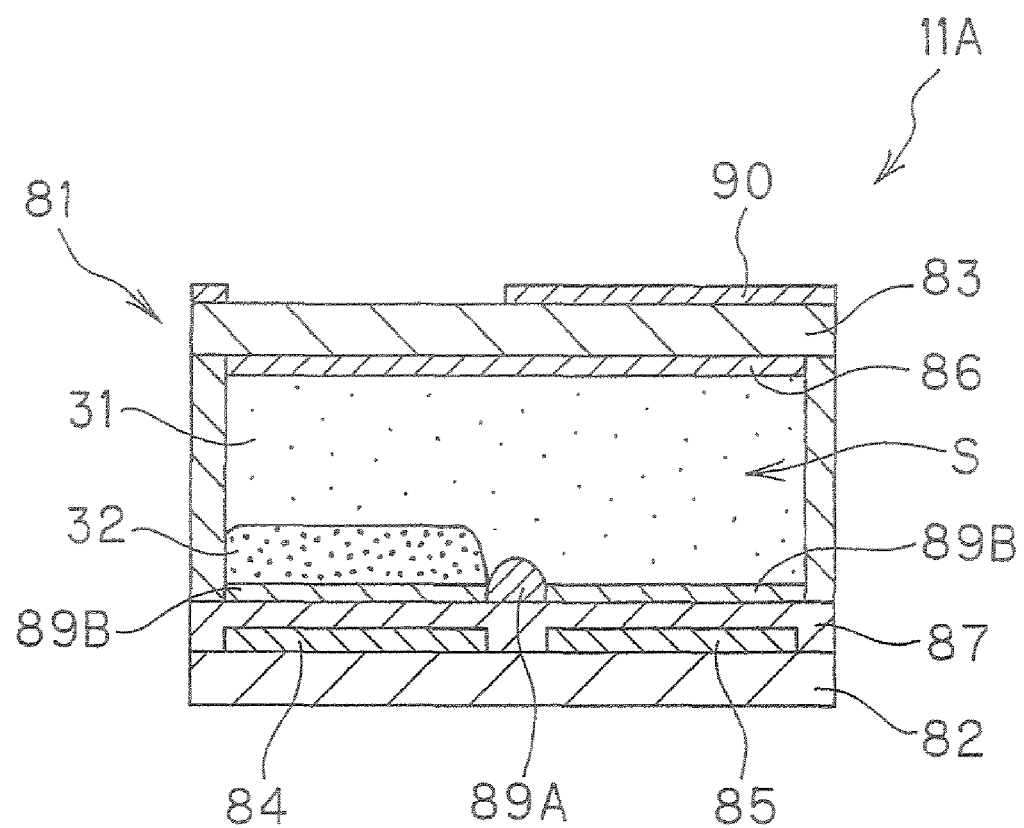
FIG. 16 is illustrative in section of a further embodiment of the display system according to the invention.

The oil repellent layer 89A that forms a part of the display cell 11A is a liquid retainer means, and could be formed of an oil repellent material such as fluororesin, and silicone resin. The oil repellent layer 89A could have a thickness in the range of, for instance, 0.01 to 100 μm, and configured in such a way as to project toward the liquid confining space S, as shown in FIG. 16. The term "oil repellent" here means that the contact angle of a droplet of tetrachloroethane is 35° or greater, as measured with a contact angle meter.

On the other hand, the lipophilic layer 89B could be made up of a material obtained by irradiation (pattern exposure) of an oil repellent fluororesin, silicone resin or the like with ultraviolet radiation, hereby cutting a side chain to impart lipophilic nature to it, or a lipophilic material such as acrylate resin. With such pattern exposure, it is possible to form the oil repellent layer 89A and the lipophilic layer 89B in a high-definition pattern. The lipophilic layer 89B could have a thickness of, for instance, 0.01 to 100 μm. Identical or different materials could be used to build up the lipophilic layer 89B located on the 1$^{st}$-A electrode 84, and the lipophilic layer 89B located on the 1$^{st}$-B electrode 85. For instance, the lipophilic nature of the lipophilic layer 89B positioned on the 1$^{st}$-A electrode 84 could be lower than that of the lipophilic layer 89B positioned on the 1$^{st}$-B electrode 85.

The substrates 82, 83, the 1$^{st}$-A and B electrodes 84, 85 and the second electrode 86 that form part of the display cell 11A could be similar to the substrates 22, 23 the 1$^{st}$-A and B electrodes 24 and 25 and the second electrode 26 in the foregoing embodiment, so their explanation is saved. It is here noted that there could be a thin film provided on the second electrode 86 that faces the liquid confining space S, and the wettability of the second liquid 32 to that thin film could be smaller than that of the second liquid 32 to the insulating layer 87. This is helpful for prevention of adhesion of the second liquid 32 to the second electrode 86, and for improvements in the wet spreading of the first liquid 31.

The insulating layer 87, the wall portion 88 and the light block film 90 that form a part of the display cell 11A, too, could be similar to the insulating layer 27, the wall portion 28 and the light block film 30 in the preceding embodiment, so their explanation is saved. It is appreciated that the wettability of the first liquid 31 to the wall portion 88 could be larger than that of the first liquid 31 to the oil repellent and lipophilic layers 89A and 89B, thereby preventing the deflection of the second liquid 32 toward the wall portion 88 of the liquid confining space S.

The first liquid 31 to be filled in the assembly 81 could be similar to the first liquid 31 to be filled in the assembly 21 in the foregoing embodiment.

On the other hand, the second liquid 32 to be filled in the assembly 81 could be similar to the second liquid 32 to be filled in the assembly 21 in the foregoing embodiment, and for that, use could be made of oils such as heptane, hexane, nonane, decane, octane, dodecane, tetradecane, octadecane, hexadecane, dodecyldecane, ethylene glycol monobutyl ether acetate, diethylene glycol monobutyl ether acetate, and ethyl benzoate, each having a surface tension at 20° C. of 10 to 73 dyne/cm, and preferably 15 to 70 dyne/cm, thereby ensuring that the oil repellent layer 89A functions more as a liquid retainer means. It is here preferable that between the specific gravity g1 of the first liquid 31 and the specific gravity g2 of the second liquid 32, there is a relation of $g1 \leq g2$.

In the invention, the second liquid 32 could be a colored oil whereby information or the like could be displayed in a desired color.

When the display cell 11A operates on a transmission mode, the first liquid 31 could be a colored liquid while the second liquid 32 is a black oil having light block capability, whereby on/off displays could be generated in two colors, a color transmitting through the colored liquid 31 and black.

The display cell 11A is not always limited to the above structure. The display cell 11A could have a structure wherein its side facing the substrate 82 is a viewing side and the light block film 90 is provided on the outside of the substrate 82. In this case, the substrate 82 is transparent, and so are the 1$^{st}$-A electrode 84, the 1$^{st}$-B electrode 85 and the insulating layer 87 plus the lipophilic layer 89B. With the display cell 11A working on a transmission mode, the substrate 83 and the second electrode 86 are transparent, too.

With no light block film 90 provided, displays could be generated by virtue of displacements of the first and second liquid 31 and 32 due to their movement. Alternatively, use could be made of a structure wherein the oil repellent and lipophilic layers 89A and 89B are directly formed on the substrate 83 and the 1$^{st}$-A and B layers 84 and 85 without the insulating layer 87, in which case insulating ones are used as the oil repellent and lipophilic layers 89A and 89B.

The display cell forming the display system of the invention is not always limited to such structure as to provide displays of numeric information of "0" to "9" or the like as shown in FIG. 1. For instance, when the display cell operates on a reflection mode, a plurality of display cells, each using the oil colored in any one of yellow, magenta and cyan as the second liquid, could be arrayed in a matrix or other form for reflection-mode full-color displays. On the other hand, when the display cell works on a transmission mode with a colored liquid as the first liquid 31 and a light block black oil as the second liquid 32, a plurality of display cells, each using any one of red, green and blue liquids as the above colored liquid 31, could be arrayed in a matrix or other form for transmission-mode full-color displays.

A plurality of unit cells, each having the 1$^{st}$-A electrode 84 and the 1$^{st}$-B electrode 85 in the same location and configuration, could be arrayed in a matrix or other form, whereby consistent display performance could be achieved throughout the display system even in the absence of, for instance, the light block film 90.

The display medium of the invention comprises one or more such display systems as described above, and has an input terminal adapted to feed power and signals from external equipment to each display cell in the display system at which input terminal the display medium can be connected to or disconnected from the external equipment. This ensures that even after there is the display medium removed from the external equipment, it is possible to retain memory capability enough to carry information with the display medium alone.

Figure 17:
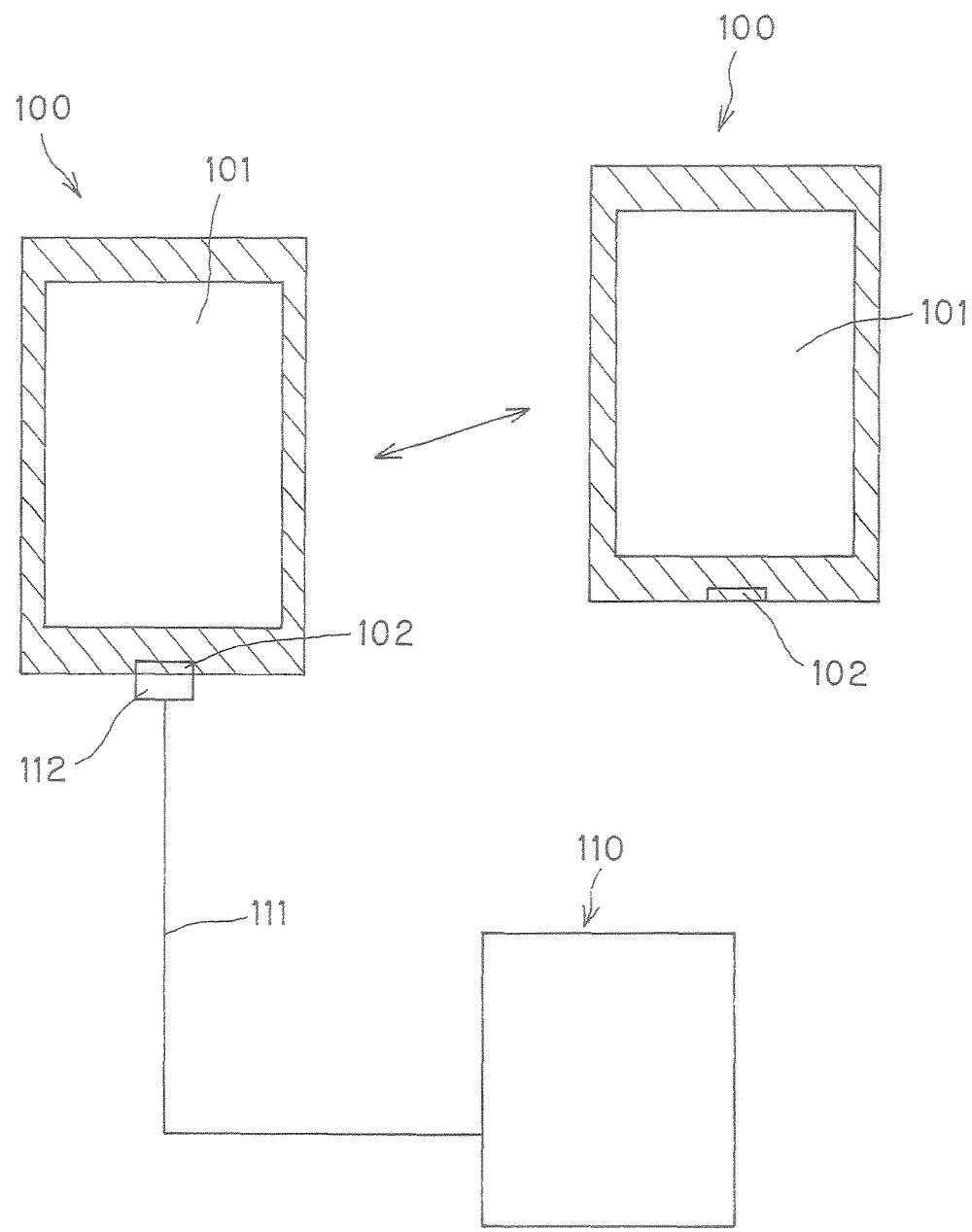
FIG. 17 is illustrative of one embodiment of the display medium according to the invention.

FIG. 17 is illustrative of one example of the display medium according to the invention. In FIG. 17, the inventive display medium 100 is built up of a display unit 101 comprising a set of multiple display systems according to the invention and an input terminal 102. There is no limitation on the number of display systems that build up the display unit 101 in the display medium 100, and as long as there is the input terminal 102 somewhere around the display unit 101 (a hatched site in FIG. 17), there is no limitation on where to locate it. The input terminal 102 is provided to feed power and signals from external equipment 110 to each display cell in the display system, and a connector 112 of transmission means 111 linked to the external equipment 110 is connected to it. At that input terminal 102, the display medium 100 is connectable to or detachable from the external equipment 110. Thus, the desired information can be displayed on the display medium 100 upon receipt of power and signals from the external equipment 110 by way of the input terminal 102 and thereafter, if the connector 112 is removed out of the input terminal 102 for disconnection of the display medium 100 from the external equipment 110, then the display medium 100 can be carried at one's disposal.

The external equipment 110, for instance, includes computer means such as a personal computer and a mainframe computer, telefacsimile machines, copiers, data communications systems and processors for wireless communications, etc., network terminals, and the internet terminals.

Not exclusively, the transmission means 111 could be those capable of feeding power and signals, for instance, electric conductor cables, and hardwire links.

The above embodiments of the invention are provided for the purpose of illustration alone.

The present invention is now explained in further details with respect to more specific examples.

Example 1

Figure 18A:
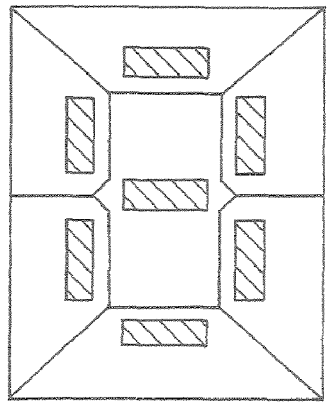
FIGS. 18A, 18B, 18C and 18D are illustrative of how to manufacture the display system in one example of the invention.

First, on a 200 μm thick PET film, a rectangular area (of 20 m×10 mm size) was set for building up a display system comprising seven display cells, as shown in FIG. 18A, and sub-areas were set for the seven display cells. A pixel segment of each display cell was set to a 6 mm×1.5 mm rectangle (a hatched site in FIG. 18A).

Figure 18B:
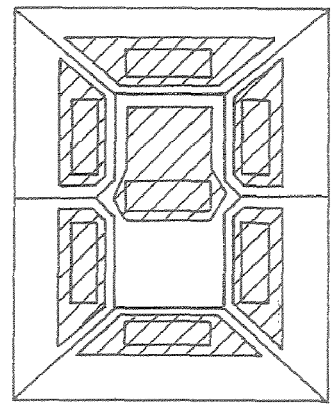
Figure 18C:
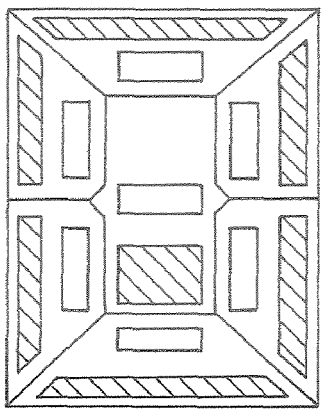

Further, an area for the formation of the $1^{st}$-A electrode (a hatched site in FIG. 18B) was set in such a way as to include the above pixel segment, and an area (a hatched site in FIG. 18C) for the formation of the $1^{st}$-B electrode was set.

Then, a Cr film (of 1,500 Å in thickness) was formed on the PET film by means of vapor deposition, and a photosensitive resist (MicroPosit made by Sipray Co., Ltd.) was applied on that Cr film to form a resist film by means of photo-lithography. Then, using that resist film as a mask, the Cr film was etched (with an etching solution: a mixed solution of sulfuric acid and hydrogen peroxide) to form the $1^{st}$-A electrode and the $1^{st}$-B electrode for each display cell. Note here that wirings (not shown in FIG. 18) for the connection of the $1^{st}$-A and $1^{st}$-B electrodes to an external voltage application unit, too, were simultaneously formed.

Then, an insulative resin (SE-7492 made by Nissan Chemical Industries, Ltd.) was coated on the PET film by means of bar coating in such a way as to cover the $1^{st}$-A and $1^{st}$-B electrodes, and cured to form a 0.8 thick insulating layer. This insulating layer was found to have a lipophilic property of about 15 in terms of the contact angle of a tetrachloroethane droplet.

Figure 18D:
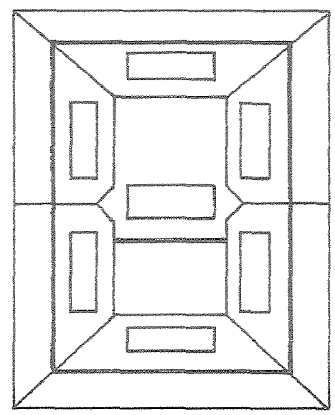

Then, the 2P technique was used with an acrylic resin having the following composition to form an intermediate partition (of 100 μm in width and 150 μm in height) in such a form as indicated by bold lines in FIG. 18D).

| Acrylic Resin Composition | |
|---|---|
| Urethane acrylate (Gohselac UV7500B made by Nippon Gosei Co., Ltd.) | 35 parts by weight |
| Acrylate monomer (1,6-Hexanediol diacrylate made by Toa Gosei Co., Ltd.) | 43 parts by weight |
| Vinyl monomer (Vinylpyrrolidone made by Toa Gosei Co., Ltd.) | 17 parts by weight |
| Photopolymerization initiator (1-Hydroxycyclohexyl phenyl ketone made by Ciba Geigy) | 4 parts by weight |
| Additive (TSF4440 made by GE Toshiba Silicone Co., Ltd.) | 0.5 part by weight |

Then, a bead-containing ultraviolet curable type resin (LCB-610 made by E.H.C) was used to form a 1 μm wide, 200 μm high wall portion on the boundary lines between the display cells and on the outer periphery edge of the display system-formation rectangular area.

On another PET film of 200 μm in thickness, on the other hand, a display system-formation rectangular area and a pixel segment of each display cell were set, as described just above. On one surface of the PET film, an indium tin oxide (ITO) film was formed by means of vapor deposition in such a way as to be in alignment with the display system-formation rectangular area to form a second electrode (common electrode). Note here that wirings for the connection of the second electrode to an external voltage application unit, too, were simultaneously formed, although not shown.

Then, on another surface of that PET film, a light blocking resin material having the following composition was applied by screen printing to form a light block film (5 μm in thickness). This light block film was provided such that it was opposed to the second electrode by way of the PET film and seven pixel segments were bared out.

| Light Blocking Resin Composition | |
|---|---|
| Black pigment (TM Black #9550 made by Dainichi Seika Kogyo Co., Ltd.) | 14 parts by weight |
| Dispersant (Dispersbyk111 made by Bic-Chemie) | 1.2 parts by weight |
| Polymer (VR60 made by Showa Polymer Co., Ltd.) | 2.8 parts by weight |
| Monomer (SR399 made by Sahtomer Co., Ltd.) | 3.5 parts by weight |
| Initiator (2-Bynzyl-2-dimethylamino-1-(4-morpholinophenyl)-butane-1 | 1.6 parts by weight |
| Initiator (4,4'-Diethylaminobenzophenone) | 0.3 part by weight |
| Initiator (2,4-Diethylthioxanthone) | 0.1 part by weight |
| Solvent (Ethylene glycol monobutyl ether) | 75.8 parts by weight |

Then, the surface of the PET film having the second electrode on it was engaged with and compressed against the wall portion of the PET film having the above intermediate partition, etc. on it, after which the wall portion was irradiated with ultraviolet radiation (60 mW/cm$^2$, five minutes) for curing. For that compression, first, water and oil (dodecyldecane dyed with a blue dye (Oil Blue 5502 made by Arimoto Chemical Industries, Ltd.)) were filled at a volumetric ratio of 2:1 in each display cell on the PET film having the intermediate partition, etc. on it, followed by alignment of the display cells on the two PET films.

In this way such an inventive display system as shown in FIG. 2 was manufactured.

As a dc voltage of 10 V was applied between all the $1^{st}$-A electrodes and the second electrode (common electrode) in all the display cells of the manufactured display system, it caused the oil (colored dodecyldecane) to go over the intermediate partition, migrating into the space (space segment) on the $1^{st}$-B electrodes. As a result, extraneous light was reflected at the $1^{st}$-A electrode-formation Cr film at all the seven pixel segments, so that a figure "8" could be viewed from the side of the PET film having the light block film on it. As the applied voltage was shut off in this state, the same display state could be retained for 10 days or longer, indicating that there was an excellent memory capability achieved.

As a do voltage of 10 V was applied between all the $1^{st}$-B electrode and the second electrode (common electrode), it caused the oil (colored dodecyldecane) to go over the intermediate partition migrating into the spaces (pixel segments) on the $1^{st}$-A electrodes, so that the blue of the oil (colored dodecyldecane) could be viewed and the figure "8" could be displayed. As the applied voltage was shut off in this state, the same display state could be retained for 10 days, indicating that there was an excellent memory capability achieved.

By the optional determination of the $1^{st}$-A or the $1^{st}$-B electrodes to which direct-current voltage was applied at the second electrode (common electrode), any desired figure of "0" to "9" could be displayed by reflected light or the blue of the oil (colored dodecyl-decane). In this case, too, there was an excellent memory capability achieved.

Example 2

As in Example 1, the $1^{st}$-A and $1^{st}$-B electrodes were formed on a 200 μm thick PET film for each display cell, and an insulating layer was provided in such a way as to cover the $1^{st}$-A and $1^{st}$-B electrodes.

On the other hand, the second electrode (common electrode) was formed on another PET film of 200 μm in thickness as in Example 1, and a light block film was formed on another surface of that PET film as in Example 1.

Then, the 2P technique was used with an acrylic resin having a similar composition as in Example 1 to form an intermediate partition (of 100 μm in width and 100 μm in height) on the insulating layer on the PET film having the above $1^{st}$-A and $1^{st}$-B electrodes, and on the second electrode on the PET film with that second electrode. The intermediate partitions were formed at the position indicated by a bold line in FIG. 18D and the intermediate partition patterns formed on both the PET films were symmetric with respect to plane. Each intermediate partition had in its upper end side 30 semi-circular cutouts of 10 μm in radius at a 0.2 mm pitch. Then, 30 circular openings of 10 μm in radius were arrayed at a 0.2 mm pitch at a position 50 μm away from the upper end side of the intermediate partition formed on the PET film having the second electrode toward the PET film side by means of laser irradiation.

Then, a bead-containing ultraviolet curable type resin (LCB-610 made by E.H.C.) was used to form a 1 mm wide, 200 μm high wall portion on the boundary lines between the display cells, each having the $1^{st}$-A and $1^{st}$-B electrodes and on the outer periphery edge of the display system-formation rectangular area.

Then water and oil (dodecyldecane dyed with a blue dye (Oil Blue 5502 made by Arimoto Chemical Industries, Ltd.)) were filled at a volumetric ratio of 2:1 in each display cell on the PET film having the wall portion formed, after which another PET film was engaged with and compressed against that wall portion. In this compressed state, the upper end sides of the intermediate partitions formed on the PET films were engaged together to form an intermediate partition for halving the liquid confining space in each cell, the semicircular cutouts were opposed to one another to from a circular opening. In this state, the wall portion was irradiated with ultraviolet radiation (60 mW/cm² , 5 minutes) for curing.

In this way, there was such an inventive display system as shown in FIG. 6 manufactured, which had such an intermediate partition as shown in FIG. 8C.

As in Example 1, the display performance of the manufactured display system was estimated while the $1^{st}$-A and $1^{st}$-B electrodes to which direct-current voltage was applied at the second electrode (common electrode) were optionally selected. As a consequence, any desired figure of "0" to "9" could be displayed by reflected light or the blue of the oil (colored dodecyldecane). Even after the applied voltage was shut off, the same display state could be retained for 10 days or longer, indicating that there was an excellent memory capability achieved.

Example 3

As in Example 1, the $1^{st}$-A and $1^{st}$-B electrodes were formed on a 200 μm thick PET film for each display cell, and an insulating layer was provided in such a way as to cover the $1^{st}$-A and $1^{st}$-B electrodes.

On the other hand, the second electrode (common electrode) was formed on another PET film of 200 μm in thickness as in Example 1, and a light block film was formed on another surface of that PET film as in Example 1.

Then, the 2P technique was used with an acrylic resin having a similar composition as in Example 1 to form an intermediate partition (of 100 μm in width and 80 μm in height) on the insulating layer on the PET film having the above $1^{st}$-A and $1^{st}$-B electrodes, and on the second electrode on the PET film with that second electrode. The intermediate partitions were formed at the position indicated by a bold line in FIG. 18D, and the intermediate partition patterns formed on both the PET films were symmetric with respect to plane. Then, 30 circular openings of 10 μm in radius were arrayed at a 0.2 μm pitch at a position 40 μm away from the upper end side of the intermediate partition formed on the PET film having the second electrode toward the PET film side by means of laser irradiation.

Then, a bead-containing ultraviolet curable type resin (LCB-610 made by E.H.C.) was used to form a 1 mm wide, 200 μm high wall portion on the boundary lines between the display cells, each having the $1^{st}$-A and $1^{st}$-B electrodes and on the outer periphery edge of the display system-formation rectangular area.

Then, water and oil (dodecyldecane dyed with a blue dye (Oil Blue 5502 made by Arimoto Chemical Industries, Ltd)) were filled at a volumetric ratio of 2:1 in each display cell on the PET film having the wall portion formed, after which another PET film was engaged with and compressed against that wall portion. In this compressed state, the upper end sides of the intermediate partitions formed on the PET films were opposed to one another at a gap of 40 μm, whereby the liquid confining space in each cell was halved by the intermediate partition having a slit-form opening of 40 μm in width. In this state, the wall portion was irradiated with ultraviolet radiation (60 mW/cm² 5 minutes) for curing.

In this way, there was such an inventive display system as shown in FIG. 6 manufactured, which had such an intermediate partition as shown in FIG. 8A.

As in Example 1, the display performance of the manufactured display system was estimated while the $1^{st}$-A and $1^{st}$-B electrodes to which direct-current voltage was applied at the second electrode (common electrode) were optionally selected. As a consequence, any desired figure of "0" to "9" could be displayed by reflected light or the blue of the oil (colored dodecyldecane). Even after the applied voltage was shut off, the same display state could be retained for 10 days or longer, indicating that there was an excellent memory capability achieved.

Example 4

Figure 19A:
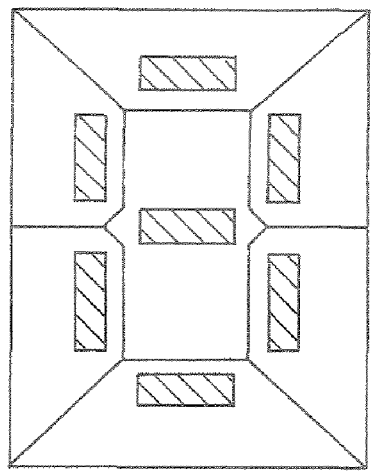
FIGS. 19A and 19B are illustrative of how to manufacture the display system in one example of the invention.

First, on a 200 μm thick PET film, a rectangular area (of 20 mm×10 mm size) was set for building up a display system comprising seven display cells, as shown in FIG. 19A, and sub-areas were set for the seven display cells. A pixel segment of each display cell was set to a 6 mm×1.5 mm rectangle (a hatched site in FIG. 19A).

Figure 19B:
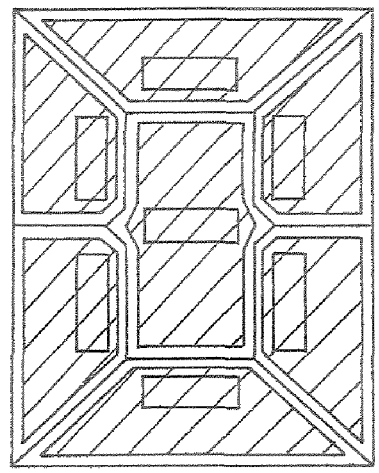

Further, an area for the formation of the $1^{st}$-A and $1^{st}$-B electrodes (a hatched site in FIG. 19B) was set in such a way as to include the above pixel segment.

Then, a Cr film (of 1,500 Å in thickness) was formed on the PET film by means of vapor deposition, and a photosensitive resist (MicroPosit made by Sipray Co., Ltd.) was applied on that Cr film to form a resist film by means of photo-lithography. Then, using that resist film as a mask, the Cr film was etched (with an etching solution: a mixed solution of sulfuric acid and hydrogen peroxide) to form the $1^{st}$-A electrode for each display cell. Note here that wirings (not shown in FIG. 19) for the connection of the $1^{st}$-A electrode of each display cell to an external voltage application unit), too, were simultaneously formed.

In the same way, the $1^{st}$-B electrode was formed on another PET film for each display cell. Then, on another surface of that PET film, a light blocking resin material as in Example 1 was applied by screen printing to form a light block film (5 μm in thickness). This light block film was provided such that it was opposed to the $1^{st}$-B electrode by way of the PET film and seven pixel segments were bared out.

Then, a 3.8 μm thick insulating layer was provided in such a way as to cover the $1^{st}$-A and $1^{st}$-B electrodes on the PET film, as in Example 1.

On the other hand photolithography was used with a 0.2 μm thick copper foil to apply a photosensitive resist (MicroPosit made by Sipray Co., Ltd.) on it to form a resist film. Then, using that resist film as a mask, the copper foil was etched (with an etching solution: a mixed solution of sulfuric acid and hydrogen peroxide) to form the second electrode over a rectangular area of 20 mm×10 my corresponding to the above display system-formation rectangular area. The second electrode had 10 μm×10 μm square through-holes at a pitch of 250 μm. Note here that wirings for the connection of the second electrode to an external voltage application unit), too, were simultaneously formed.

Then, a 1 μm wide, 100 μm high wall portion was formed on the boundary line of each display cell on the PET film having the $1^{st}$-A electrode, and on the outer periphery edge of the display system-formation rectangular area.

Then, the second electrode was place across that wall portion, after which, in a state when the second electrode was held on the above wall portion, a 1 mm wide, 100 μm high wall portion was formed as described above.

Then, water and oil (dodecyldecane dyed with a blue dye (Oil Blue 5502 made by Arimoto Chemical Industries, Ltd.)) were filled at a volumetric ratio of 2:1 in each display cell on the PET film having the $1^{st}$-B electrode on it, after with the PET film having the wall portion was engaged with and compressed against that wall portion. In the compressed state, the $1^{st}$-A and $1^{st}$-B electrodes were opposed to one another by way of the second electrode in each display cell. And then, in this state, the wall portion was irradiated with ultraviolet radiation (60 mW/cm², 5 minutes) for curing.

In this way such an inventive display system as shown in FIG. 9 was manufactured.

As a dc voltage of 10 V was applied between all the $1^{st}$-A electrodes and the second electrode (common electrode) in all the display cells of the manufactured display system, it caused the oil (colored dodecyldecane) to go through the through-holes in the second electrode, migrating into the space on the $1^{st}$-B electrode side. Consequently, at all the seven pixel segments, the blue of the oil (colored dodecyldecane) was viewed from the side of the PET film having the light block film formed on it, so that a figure "8" could be displayed. As the applied voltage was shut off in this state, the same display state could be retained for 10 days or longer, indicating that there was an excellent memory capability achieved.

As a dc voltage of 10 V was applied between all the $1^{st}$-B electrode and the second electrode (common electrode), it caused the oil (colored dodecyldecane) to go through the through-holes in the second electrode, migrating into the spaces on the $1^{st}$-A electrodes, so that extraneous light was reflected at the copper foil forming a part of the second electrode to display a figure "8". As the applied voltage was shut off in this state, the same display state could be retained for 10 days, indicating that there was an excellent memory capability achieved.

By the optional determination of the $1^{st}$-A or the $1^{st}$-B electrodes to which direct-current voltage was applied at the second electrode (common electrode), any desired figure of "0" to "9" could be displayed by reflected light or the blue of the oil (colored dodecyl-decane). In this case, too, there was an excellent memory capability achieved.

Example 5

As in Example 1, the $1^{st}$-A and $1^{st}$-B electrodes were formed on a 200 μm thick PET film for each display cell, and an insulating layer was provided in such a way as to cover the $1^{st}$-A and $1^{st}$-B electrodes.

Then, a 1% by weight isopropyl alcohol solution of an oil repellent fluoroalkylsilane (a 15 mixture (by weight) of TSL8233 and YSL8114 made by GE Toshiba Silicone Co., Ltd.) was coated by spin coating in such a way as to cover the above insulating layer. Thereafter, a mask having a light-transmitting portion was provided over a site corresponding to the $1^{st}$-A and $1^{st}$-B electrodes, and a photo-catalyst composition (a binder resin (TSL8223 made by Toshiba Silicone Co., Ltd.) with a photo-catalyst titanium oxide contained therein in an amount of 30% by weight) was spin coated on one side of that mask, and dried to form a catalyst layer of 0.1 μm in thickness.

While the above mask was opposed on its catalyst layer side to the surface coated with the oil repellent fluoroalkylsilane, proximity exposure was carried out (using light having a wavelength of shorter than 380 nm (254 nm)). Consequently, in each display cell area, an oil repellent layer (of 0.02 μm in thickness) was formed at a site with no $1^{st}$-A and $1^{st}$-B electrodes found (a non-exposure site) and, in a site corresponding to the $1^{st}$-A and $1^{st}$-B electrodes, the side chain of the oil repellent layer was replaced by a hydroxyl group to form a lipophilic layer (of 0.02 μm in thickness).

On the other hand, the second electrode (common electrode) was formed on another PET film of 200 μm in thickness as in Example 1, and a light block layer was formed on another surface of that PET film as in Example 1.

Then, a 1 μm wide, 200 μm high wall portion was formed on the boundary line of each display cell on the PET film having the $1^{st}$-B electrode, and on the outer periphery edge of the display system-formation rectangular area, as in Example 1.

Then, water and oil (dodecyldecane dyed with a blue dye (Oil Blue 5502 made by Arimoto Chemical Industries, Ltd.)) were filled at a volumetric ratio of 2:1 in each display cell on the PET film having the second electrode on it, after with the PET film having the wall portion was engaged with and compressed against that wall portion. And then, the wall portion was irradiated with ultraviolet radiation (60 mW/cm², 5 minutes) for curing.

In this way such an inventive display system as shown in FIG. 14 was manufactured.

As a dc voltage of 10 V was applied between all the $1^{st}$-A electrodes and the second electrode (common electrode) in all the display cells of the manufactured display system, it caused the oil (colored dodecyldecane) to go over the oil repellent layer, migrating into the space (space segment) on the $1^{st}$-B electrode. Consequently, at all the seven pixel segments, extraneous light was reflected by the Cr film forming the $1^{st}$-A electrode to display a figure "8". As the applied voltage was shut off in this state, the same display state could be retained for 10 days or longer, indicating that there was an excellent memory capability achieved.

As a dc voltage of 10 V was applied between all the $1^{st}$-B electrode and the second electrode (common electrode), it caused the oil (colored dodecyldecane) to go over the oil repellent layer, migrating into the spaces (pixel segments) on the $1^{st}$-A electrode, so that at the pixel segments the blue of the oil (colored dodecyldecan) was viewed to display a figure "8". As the applied voltage was shut off in this state, the same display state could be retained for 10 days, indicating that there was an excellent memory capability achieved.

By the optional determination of the $1^{st}$-A or the $1^{st}$-B electrodes to which direct-current voltage was applied at the second electrode (common electrode) any desired figure of "0" to "9" could be displayed by reflected light or the blue of the oil (colored dodecyl-decane). In this case, too, there was an excellent memory capability achieved.

POSSIBLE UTILIZATION IN THE INDUSTRY

The present invention is applicable to fields for which memory capability is needed.

What we claim is:

1. A display system including at least one display cell comprising:
    an assembly including at least a first electrode and a second electrode and including mutually non-miscible first and second liquids,
    wherein either one of said first and second electrodes is electrically insulated from said first and second liquids, said first liquid has electrical conductivity or polarity, a voltage is applied to one or both of said first and second electrodes, whereby said first liquid and said second liquid vary in position to produce a display, and after an applied voltage is shut off at a position to which said first and second liquids have migrated, positions of said first and second liquids that have migrated are retained to provide a memory capability;
    a set of substrates, at least one of which is transparent;
    a wall portion for holding said set of substrates in opposition to one another to define a liquid confining space; and
    the first electrode and a third electrode are located on a side of one substrate to face said liquid confining space, and are electrically independent,
    further comprising a liquid retainer means for retaining the positions of said first and second liquids that have migrated, after the applied voltage is shut off at the positions of said first and second liquids that have migrated,
    the assembly further comprising:
    an intermediate partition located between said first and third electrodes; and
    the second electrode is located on another substrate that faces said liquid confining space,
    wherein said first and third electrodes are electrically insulated from said first and second liquids,
    upon application of a voltage to said first electrode and said second electrode or to said third electrode and said second electrode, said second liquid transits said intermediate partition to migrate between a position adjacent to said first electrode and a position adjacent to said third electrode; and
    said intermediate partition provides said liquid retainer means.

2. The display system of claim 1, wherein a wettability of said first liquid to said wall portion is larger than that of said first liquid to said first electrode and said third electrode.

3. The display system of claim 1, wherein there is a thin film provided on said second electrode that faces said liquid confining space, wherein a wettability of said second liquid to said thin film is smaller than that of said second liquid to said first electrode and said third electrode.

4. The display system of claim 1, wherein a lipophilic insulating film is located over the surfaces of said first electrode and said third electrode coming into contact with said first and second liquids.

5. The display system of claim 4, wherein a wettability of said first liquid to said wall portion is larger than that of said first liquid to said insulating layer.

6. The display system of claim 4, wherein there is a thin film provided on said second electrode that faces said liquid confining space, wherein a wettability of said second liquid to said thin film is smaller than that of said second liquid to said insulating layer.

7. The display system of claim 1, wherein said intermediate partition has a height enough to ensure that when the applied voltage is shut off, said second liquid resting on said first electrode or said third electrode does not go over it.

8. The display system of claim 1, wherein a desired pattern of light block film is provided externally of the transparent substrate on a display viewing side.

9. The display system of claim 1, wherein said second liquid is colored oil.

10. The display system of claim 9, wherein there is a reflection type display where light reflected from within the display cell is viewed, and the colored oil that is said second liquid filled in each display cell is any one of yellow, magenta, and cyan.

11. The display system of claim 9, wherein there is a transmission type display where light transmitting through the display cell is viewed, and said first liquid is colored water while the colored oil that is said second liquid is a light blocking black oil.

12. The display system of claim 11, wherein the colored water that is said first liquid filled in each display cell is any one of red, green, and blue.

13. The display system of claim 1, wherein said first electrode and said third electrode for each display cell are identical in configuration and position.

14. A display medium comprising at least one display system as recited in claim 1, further comprising:
    an input terminal for feeding power and signals from external equipment to each display cell in said display system, wherein at said input terminal said display medium can be connected to or disconnected from said external equipment.

* * * * *

UNITED STATES PATENT AND TRADEMARK OFFICE
CERTIFICATE OF CORRECTION

| | | |
|---|---|---|
| PATENT NO. | : 7,911,681 B2 | Page 1 of 1 |
| APPLICATION NO. | : 11/573593 | |
| DATED | : March 22, 2011 | |
| INVENTOR(S) | : Kanami Ikegami et al. | |

It is certified that error appears in the above-identified patent and that said Letters Patent is hereby corrected as shown below:

On the title page, Item (86), the PCT No. should read:

-- (86) PCT No.:   PCT/JP2006/315366

§ 371 (c)(1),
(2), (4) Date: Feb. 12, 2007 --

Signed and Sealed this
Tenth Day of May, 2011

David J. Kappos
*Director of the United States Patent and Trademark Office*